United States Patent
Sandberg et al.

(10) Patent No.: US 10,491,330 B2
(45) Date of Patent: Nov. 26, 2019

(54) WIRELESS NODE FOR A WIRELESS COMMUNICATION SYSTEM AND METHOD THEREOF

(71) Applicant: TELEFONAKTIEBOLAGET LM ERICSSON (PUBL), Stockholm (SE)

(72) Inventors: Sara Sandberg, Luleå (SE); Mattias Andersson, Sundbyberg (SE); Yufei Blankenship, Kildeer, IL (US)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 37 days.

(21) Appl. No.: 15/515,278

(22) PCT Filed: Jan. 11, 2017

(86) PCT No.: PCT/SE2017/050020
§ 371 (c)(1),
(2) Date: Mar. 29, 2017

(87) PCT Pub. No.: WO2018/030927
PCT Pub. Date: Feb. 15, 2018

(65) Prior Publication Data
US 2018/0048419 A1  Feb. 15, 2018

Related U.S. Application Data

(60) Provisional application No. 62/373,555, filed on Aug. 11, 2016.

(51) Int. Cl.
*H04L 1/00* (2006.01)
*H04W 84/12* (2009.01)

(52) U.S. Cl.
CPC .......... *H04L 1/0041* (2013.01); *H04L 1/0057* (2013.01); *H04L 1/0058* (2013.01); *H04L 1/0067* (2013.01); *H04W 84/12* (2013.01)

(58) Field of Classification Search
CPC ..... H04L 1/0041; H04L 1/0058; H04W 84/12
See application file for complete search history.

(56) References Cited

U.S. PATENT DOCUMENTS

| 8,583,980 B2 | 11/2013 | Livshitz | |
| 2006/0218459 A1* | 9/2006 | Hedberg | H03M 13/1102 714/752 |

FOREIGN PATENT DOCUMENTS

WO    2006/039801 A1    4/2006

OTHER PUBLICATIONS

International Search Report and Written Opinion in corresponding International Application No. PCT/SE2017/050020 dated Apr. 13, 2017.

(Continued)

*Primary Examiner* — Thien Nguyen
(74) *Attorney, Agent, or Firm* — Patent Portfolio Builders PLLC

(57) ABSTRACT

The disclosure relates to a first wireless node for a wireless communication system, the wireless node comprising processing means operative to obtain input data, a set of target parity encoding properties for the input data and a set of predetermined parity encoding codes each having a set of offered parity encoding properties, obtain a candidate parity encoding code from the set of predetermined parity encoding codes by evaluating a set of criteria on the set of target parity encoding properties and the sets of offered parity encoding properties, wherein evaluating the set of criteria comprises comparing a target information block length and a target number of encoding parity bits, comprised in the target parity encoding properties, to an offered information block length and an offered number of encoding parity bits, comprised in the offered parity encoding properties, and generate transmission data by encoding the input data using the candidate parity encoding code. The disclosure further (Continued)

relates to a method thereof, a computer program, a computer program product and a carrier.

20 Claims, 14 Drawing Sheets

(56) References Cited

OTHER PUBLICATIONS

IEEE Computer Society, "IEEE Std 802.11-2012, Part 11: Wireless LAN Medium Access Control (MAC) and Physical Layer (PHY) Specifications," Mar. 29, 2012.

\* cited by examiner

| TEP | | |
|---|---|---|
| k_0 | R_0 | p_0 |

Fig. 4a

| MC | OEP | | |
|---|---|---|---|
| MC₁ | k_1 | R_1 | p_1 |
| MC₂ | k_2 | R_2 | p_2 |
| ⋮ | | | |
| MC_M | k_M | R_M | p_M |

Fig. 4b

Table 20-15—LDPC parameters

| Coding rate (R) | LDPC information block length (bits) | LDPC codeword block length (bits) |
|---|---|---|
| 1/2 | 972 | 1944 |
| 1/2 | 648 | 1296 |
| 1/2 | 324 | 648 |
| 2/3 | 1296 | 1944 |
| 2/3 | 864 | 1296 |
| 2/3 | 432 | 648 |
| 3/4 | 1458 | 1944 |
| 3/4 | 972 | 1296 |
| 3/4 | 486 | 648 |
| 5/6 | 1620 | 1944 |
| 5/6 | 1080 | 1296 |
| 5/6 | 540 | 648 |

WIRELESS NODE FOR A WIRELESS COMMUNICATION SYSTEM AND METHOD THEREOF

TECHNICAL FIELD

The present disclosure relates to a wireless node for a wireless communication system. Furthermore, the present disclosure also relates to a corresponding method, computer program and computer program product.

BACKGROUND

Parity encoding input data before transmission by a wireless node may be performed by applying channel codes, e.g. Low-density parity-check (LDPC) codes. LDPC codes may be optimized for any block length and/or any code rate. LDPC codes may be described as a parity-check matrix (PCM). However, it is not efficient to use different PCMs for each alternative/combination of block lengths and code rates in communication systems. Instead, rate matching techniques are implemented to adapt a predefined code or PCM, selected from a set of predefined PCMs having different combinations of offered block lengths and code rates, e.g. through shortening, puncturing and repetition. As an example, LDPC codes for 802.11n as specified in IEEE Std 802.11-2012. Part 11: Wireless LAN Medium Access Control (MAC) and Physical Layer (PHY) Specifications, Sec. 20.3.11.7 and Annex F are specified with 12 mother codes (3 different block lengths and 4 different code rates). PCMs for all other block lengths and code rates needed are derived through shortening, puncturing and repetition applied to one of the 12 mother codes. Given a set of LDPC mother codes, it is not obvious which code to start from when applying shortening, puncturing and repetition. All of these rate matching techniques give codes that are suboptimal compared to dedicated LDPC codes optimized for a specific block length and rate. The conventional method for selection of mother codes, e.g. as specified in 802.11n, restricts the final code after shortening, puncturing, and repetition to have the same rate as one of the predefined mother codes. This is non-optimal and may result in reduced performance.

Thus there is a need to provide a solution which mitigates or solves the drawbacks and problems of conventional solutions.

SUMMARY

An objective of embodiments of the present disclosures is to provide a solution which mitigates or solves the drawbacks and problems of conventional solutions.

This objective is solved by the subject matter described herein. Further advantageous implementation forms of the present disclosure can be found in the dependent claims.

According to a first aspect of the disclosure, the above mentioned objective is achieved with a method for a first wireless node for a wireless communication system. The method comprising obtaining input data, a set of target parity encoding properties for the input data and a set of predetermined parity encoding codes each having a set of offered parity encoding properties. The method further comprises obtaining a candidate parity encoding code from the set of predetermined parity encoding codes by evaluating a set of criteria on the set of target parity encoding properties and the sets of offered parity encoding properties. Where evaluating the set of criteria comprises comparing a target information block length and a target number of encoding parity bits, comprised in the target parity encoding properties, to an offered information block length and an offered number of encoding parity bits, comprised in the offered parity encoding properties. The method further comprises generating transmission data by encoding the input data using the candidate parity encoding code.

An advantage of the wireless node according to the first aspect is that the block-error rates of the encoded input data may be reduced by selecting the best or most suitable candidate parity encoding code from the set of predetermined parity encoding codes.

In a first possible implementation form of a method according to the first aspect, obtaining the candidate parity encoding code is performed if it is evaluated that an offered information block length, of the candidate parity encoding code, is equal to or greater than the target information block length. This implementation form has at least the advantage to reduce computational complexity by ensuring that the information block length offered when using the candidate parity encoding code is sufficient. Furthermore, this implementation form may further reduce computational complexity by only obtaining or selecting a subset of the predefined mother codes for further evaluation.

In a second possible implementation form of a method according to the first implementation form or the first aspect as such, obtaining the candidate parity encoding code is performed if it is further evaluated that an offered number of encoding parity bits, of the candidate parity encoding code, is closest to the target number of encoding parity bits. This implementation form has at least the advantage of further reducing block-error rates by selecting the best suited mother code in the set of specified mother codes.

In a third possible implementation form of a method according to any of the preceding implementation forms or the first aspect as such, obtain the candidate parity encoding code is performed if it is evaluated that the offered number of encoding parity bits, of the candidate parity encoding code, is equal to or greater than the target number of encoding parity bits. This implementation form has at least the advantage that computational complexity of the mother code selection process is reduced by eliminating the need for rate matching by performing repetition. A further advantage is that the block error rate, BLER, is reduced by eliminating the need for rate matching by performing repetition.

According to a second aspect of the disclosure, the above mentioned objective is achieved with a first wireless node for a wireless communication system, the wireless node comprising processing means operative to perform the method according to the first aspect or any implementation form of the first aspect. In a first possible implementation form of the second aspect, the first wireless node further comprises a transceiver configured to emit a wireless signal S comprising the transmission data.

According to a third aspect of the disclosure, the above mentioned objective is achieved with a method for a second wireless node for a wireless communication system. The method comprises obtaining transmission data. The method further comprises obtaining a set of target parity encoding properties for the transmission data and a set of predetermined parity encoding codes each having a set of offered parity encoding properties. The method further comprises selecting a candidate parity encoding code from the set of predetermined parity encoding codes by evaluating a set of criteria on the set of target parity encoding properties and the sets of offered parity encoding properties. Where evaluating the set of criteria comprises comparing a target information block length and a target number of encoding parity bits, comprised in the target parity encoding properties, to an offered information block length and an offered number of encoding parity bits, comprised in the offered parity encoding properties. The method further comprises generating output data by decoding the input data using the candidate parity encoding code.

According to a fourth aspect of the disclosure, the above mentioned objective is achieved with a second wireless node for a wireless communication system, the second wireless node comprising processing means operative to perform the method according to the third aspect. In a first possible implementation form of the fourth aspect, the second wireless node further comprises a transceiver configured to receive a wireless signal S comprising the transmission data.

According to a fifth aspect of the disclosure, the above mentioned objective is achieved with a computer program, comprising instructions which, when executed on at least one processor, cause the at least one processor to carry out the method according to any of the methods according to the first aspect or third aspect.

According to a sixth aspect of the disclosure, the above mentioned objective is achieved with a computer program product comprising a memory or digital storage medium storing the computer program according to the fifth aspect.

According to a seventh aspect of the disclosure, the above mentioned objective is achieved with a carrier containing the computer program of the fifth aspect, wherein the carrier is one of an electronic signal, optical signal, radio signal, or computer readable storage medium.

The advantages of the wireless nodes, methods, computer program, computer program product and carrier according to the second aspect to the seventh aspect are the same as those for the corresponding device claims according to the first aspect.

Further applications and advantages of the present disclosure will be apparent from the following detailed description.

BRIEF DESCRIPTION OF THE DRAWINGS

FIGS. 4a and 4b illustrates examples of target parity encoding properties and offered parity encoding properties according to an embodiment of the present disclosure.

FIG. 10 shows a table illustrating a set of predetermined parity encoding codes with associated sets of offered parity encoding properties $OEP_1$-$OEP_M$ according to an embodiment of the present disclosure.

Embodiments of the present disclosure and their advantages are best understood by referring to the detailed description that follows. It should be appreciated that like reference numerals are used to identify like elements illustrated in one or more of the figures.

DETAILED DESCRIPTION

In the following disclosure further embodiments of the disclosure are described in mainly 3GPP context with its terminology. However, embodiments of the disclosure are not limited to 3GPP communication systems, such as LTE and LTE Advanced and may include other communication systems, such as IEEE 802.11n.

An "or" in this description and the corresponding claims is to be understood as a mathematical OR which covers "and" and "or", and is not to be understand as an XOR (exclusive OR). The indefinite article "a" in this disclosure and claims is not limited to "one" and can also be understood as "one or more", i.e., plural.

It is understood that the expression "obtaining" may include selecting, determining or calculating in the present disclosure. It is also understood that the expression "configured to" may include "operative to" and/or "adapted to" in the present disclosure.

Figure 1:
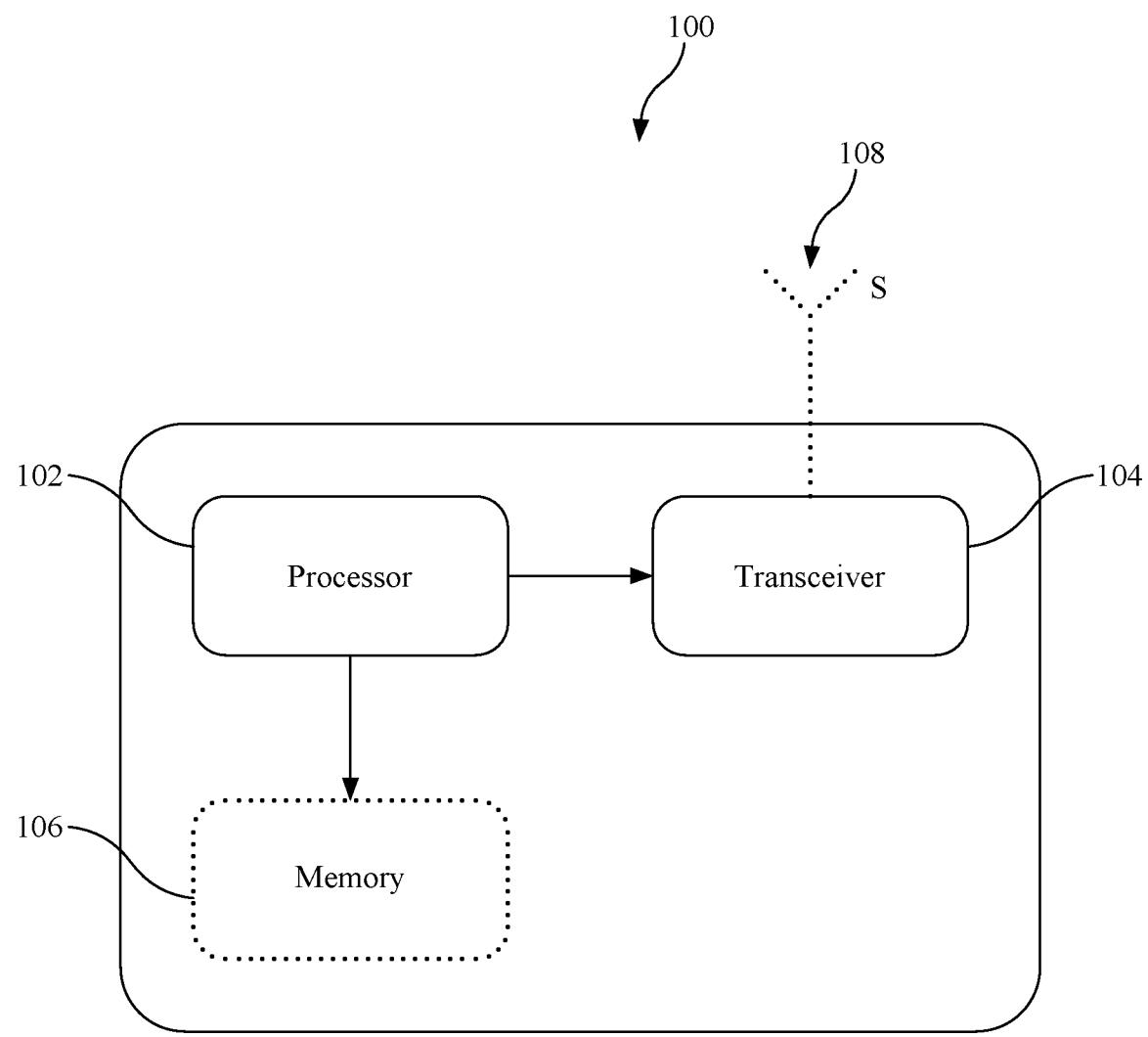
FIG. 1 shows a wireless node for a wireless communication system according to an embodiment of the present disclosure.

FIG. 1 shows a wireless node 100 according to an embodiment of the disclosure. The wireless node 100 comprises processing means 102 communicatively coupled to a transceiver 104. Further, the wireless node 100 may further comprise one or more optional antennas 108, as shown in FIG. 1. The antenna/s 108 is/are coupled to the transceiver 104 and is configured to transmit and/or emit and/or receive a wireless signals S in a wireless communication system, e.g. emit transmission data comprised in and/or included in the wireless signals S. The processing means 102 may further comprise a processor and/or a processor unit (not shown in the figure), e.g. processing circuitry and/or a central processing unit and/or processor modules and/or multiple processors configured to cooperate with each-other, and a memory 106. The memory may contain instructions executable by the processor to perform the methods described herein. The processing means may be communicatively coupled to any or all of the transceiver 104 and memory 106. In this disclosure a wireless node 100 may refer to a user equipment UE, wireless terminal, mobile phone, smart phone, network control node, network access node, an access point or a base station, e.g., a Radio Base Station (RBS), which in some networks may be referred to as transmitter, "eNB", "eNodeB", "NodeB" or "B node", depending on the technology and terminology used. The wireless nodes may be of different classes such as, e.g., macro eNodeB, home eNodeB or pico base station, based on transmission power and thereby also cell size. The wireless node can be an 802.11 access point or a Station (STA), which is any device that contains an IEEE 802.11—conformant Media Access Control (MAC) and Physical Layer (PHY) interface to the Wireless Medium (WM). The wireless node 100 is however not limited to the above mentioned communication devices and/or wireless nodes.

Figure 2:
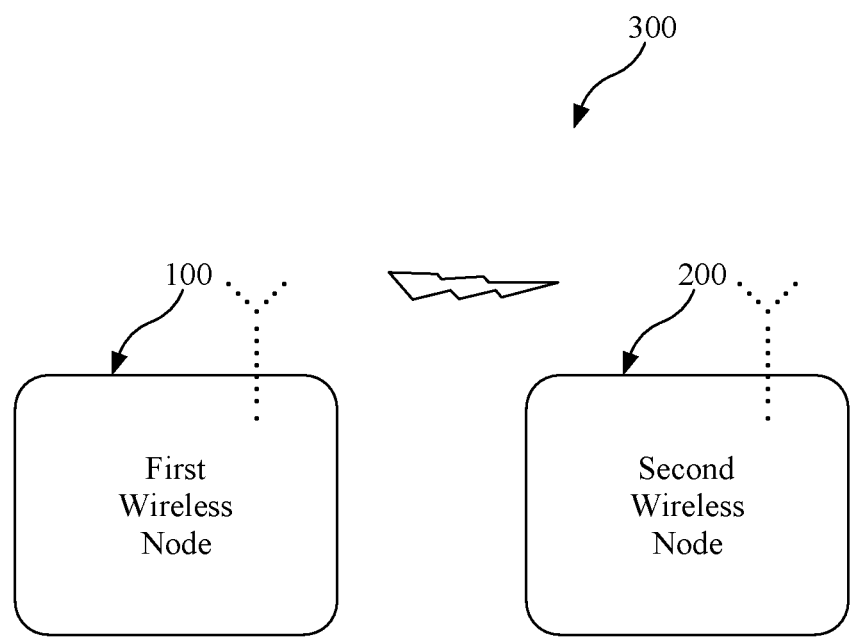
FIG. 2 shows a wireless communication system comprising a first and a second wireless node.

FIG. 2 shows a wireless communication system (300) comprising a first a wireless node 100 and a second a wireless node 200, wherein the first wireless node 100 is configured and/or operative to send a wireless signals S to the second a wireless node 200 or vice versa. The wireless communication system (300) may be a UMTS, LTE, LTE Advanced, 802.11 family systems or any other wireless system known to a skilled person.

Figure 3:
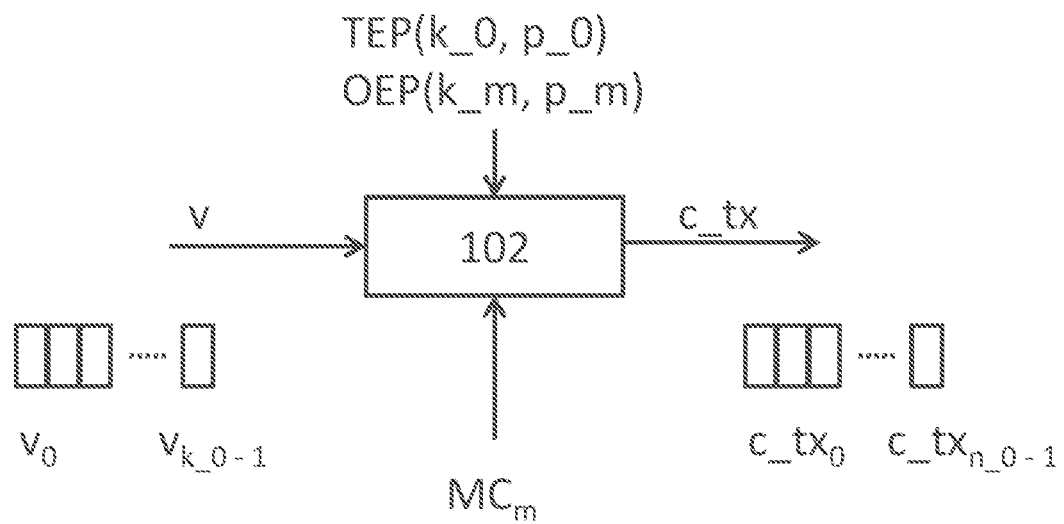
FIG. 3 shows processing means generating transmission data based on input data according to an embodiment of the present disclosure.

FIG. 3 shows how the processing means 102 may generate transmission data c_tx based on input data v according to an embodiment of the present disclosure. The processing means 102 may be comprised in a wireless node as further described in relation to FIG. 1. The processing means 102 may be configured to obtain input data v, a set of target parity encoding properties TEP for the input data v and a set of predetermined parity encoding codes each having a set of offered parity encoding properties. The input data v may have an information block size and/or length and/or transport block size, TBS, of k_0 bits, which forms the target/wanted/desired information block size and/or length for encoding. The information block size and/or length and/or TBS may include additional cyclic redundancy check bits. The processing means 102 may be configured to select a candidate parity encoding code $MC_m$ from a set of predetermined parity encoding codes $MC_1$-$MC_M$ by evaluating a set of criteria on the set of target parity encoding properties TEP and the sets of offered parity encoding properties $OEP_1$-$OEP_M$. The processing means 102 may be configured to generate transmission data c_tx by encoding the input data v using the candidate parity encoding code $MC_m$.

In one example, the set of predetermined parity encoding codes $MC_1$-$MC_M$ is obtained as a complete set of predefined mother codes, e.g. stored in memory, and/or obtained as a subset of predefined mother codes. The predefined mother codes may be calculated, received from the second wireless node 200 or any other communication system 300 node or retrieved from a memory 106 and/or other digital storage medium In one example, the set of predetermined parity encoding codes $MC_1$-$MC_M$ is obtained by obtaining predetermined parity encoding codes $MC_1$-$MC_M$ that have an offered information block length k_m, of the candidate parity encoding code $MC_m$, that is equal to or greater than the target information block length k_0.

Evaluating the set of criteria may comprise comparing a target information block length k_0 and a target number of encoding parity bits p_0, comprised in the target parity encoding properties TEP, to an offered information block length k_i and an offered number of encoding parity bits p_i, comprised in the offered parity encoding properties $OEP_1$-$OEP_M$.

In one example, each candidate parity encoding code $MC_m$, may have an offered information block length k_m, of the candidate parity encoding code $MC_m$, and an offered number of encoding parity bits p_m, of the candidate parity encoding code $MC_m$ associated and/or linked to the candidate parity encoding code $MC_m$, as further described in relation to FIG. 4b. In one example, the candidate parity encoding code $MC_m$ is determined and/or obtained and/or selected if it is evaluated that the offered number of encoding parity bits p_m, of the candidate parity encoding code $MC_m$, is closest to the target number of encoding parity bits p_0. The offered number of encoding parity bits p_m may be closest to the target number of encoding parity bits p_0 of all the offered number of encoding parity bits p_i of the sets of offered parity encoding properties OEP1-OEPM. In one further example, the candidate parity encoding code $MC_m$ is obtained and/or selected if it is further evaluated that the offered number of encoding parity bits p_m, of the candidate parity encoding code $MC_m$, is equal to or greater than the target number of encoding parity bits p_0, e.g. to increase the performance by avoiding having to perform rate matching by repetition.

In an embodiment, the processing means 102 may be configured to obtain the candidate parity encoding code $MC_m$ if it is evaluated that an offered information block length k_m, of the candidate parity encoding code $MC_m$, is equal to or greater than the target information block length k_0. In one example, a subset of mother codes from a total set of mother codes retrieved from memory or received from another wireless node is obtained or selected. This has at least the advantage to ensure that computational complexity is reduced by ensuring that the information block size and/or length offered when using the candidate parity encoding code $MC_m$ is sufficient to accommodate the input data v.

The processing means 102 may further be configured to obtain the candidate parity encoding code $MC_M$ if it is further evaluated that an offered number of encoding parity bits p_m, of the candidate parity encoding code $MC_M$, is closest to the target number of encoding parity bits p_0. The offered number of encoding parity bits p_m, of the candidate parity encoding code $MC_M$, may be closest to the target number of encoding parity bits p_0 of all the offered number of encoding parity bits p_i, i=1–M, of the sets of offered parity encoding properties $OEP_1$-$OEP_M$. In one example, evaluating that the offered number of encoding parity bits p_m is closest to the target number of encoding parity bits p_0 may be performed by evaluating that the offered parity encoding properties $OEP_M$ of the candidate parity encoding code $MC_M$ fulfils the condition |p_0−p_m|=min|p_0−p_i|, where i=1–M. Alternatively described, select the candidate mother code MCi=m that minimizes |p_0−p_i| with index m. This embodiment has at least the advantage of reducing block-error rates by selecting the best suited mother code in the set of specified mother codes.

The processing means 102 may further be configured to obtain the candidate parity encoding code $MC_m$ only if it is evaluated that the offered number of encoding parity bits p_m, of the candidate parity encoding code $MC_m$, is equal to or greater than the target number of encoding parity bits p_0. This embodiment has at least the advantage that performance may be increased by eliminating the need for rate matching by performing repetition.

The processing means 102 may further be configured to generate transmission data c_tx by encoding the input data v using the candidate parity encoding code $MC_m$, e.g. by using a parity-check matrix (PCM), where the rows and columns may correspond to check nodes and variable nodes, respectively. When using LDPC codes as parity encoding codes, a candidate parity encoding code $MC_m$ may be defined by a parity check matrix Hm, where the parity check matrix Hm has dimension of (n_m−k_m) rows by n_m columns, n_m=k_m/R_m. Each one in the PCM may correspond to an edge between a check node and a variable node. The processing means 102 may be configured and/or operative to generate transmission data c_tx with a block size and/or length of n_0, where n_0=k_0+p_0 and where p_0 is a target number of encoding parity bits desired for the transmission and k_0 is the target/wanted/desired information block size and/or length. A code rate and/or encoding rate (R_0, R_i, R_m) may be defined as the number of information bits k comprised in the input data v divided by the number of coded bits n, R=k/n. In an embodiment n may be the number of columns in the PCM and k may equal the number of columns minus the number of rows of the PCM. If all coded bits are not transmitted, the code rate may be calculated based on the number of transmitted coded bits instead, that is, R=k/n transmitted.

Optionally, the processing means 102 may further be configured to determine that there is a mismatch between an offered encoding rate R_m of the candidate parity encoding code $MC_m$ and a target encoding rate R_0, comprised in the target parity encoding properties TEP. If there is a mismatch between the offered encoding rate R_m and the target encoding rate R_0, the processing means 102 may further be configured to rate match the offered encoding rate R_m of the candidate parity encoding code $MC_m$ by performing a selection of shortening, puncturing and repetition. Optionally, the processing means 102 may further be configured to determine that there is a match between the offered encoding rate R_m of the candidate parity encoding code $MC_m$ and the target encoding rate R_0, comprised in the target parity encoding properties TEP and adapted to determine that the offered information block length k_m, of the candidate parity encoding code $MC_m$, is greater than the target information block length k_0. If there is a match between the offered encoding rate R_m and the target encoding rate R_0 and the offered information block length k_m is greater than the target information block length k_0, the processing means 102 may further be configured to rate match the offered encoding rate R_m of the candidate parity encoding code $MC_m$ by performing a selection of shortening, puncturing and repetition.

An advantage of the wireless node 100 according to this embodiment is that the block-error rates of the encoded input data may be further reduced by applying the rate matching techniques to the best candidate parity encoding code $MC_m$ from the set of predetermined parity encoding codes $MC_1$-$MC_M$.

FIG. 4a illustrates an example of target parity encoding properties TEP according to an embodiment of the present disclosure. The TEP may comprise a target information block length k_0, e.g. equal to the length/block size of input data v, a block size and/or length and/or transport block size, TBS, as further described in relation to FIG. 3. The TEP may further comprise a target encoding rate R_0 indicating a ratio of the block size and/or length and/or transport block size, TBS, n_0 of the transmission data c_tx and the target information block length k_0 of the input data v, R_0=k_0/n_0. The TEP may further comprise a target number of encoding parity bits p_0 indicating the desired number of parity bits. The TEP may be implemented as a data structure, e.g. stored in the memory 106, such as a table and/or a look-up table LUT, or received from a second wireless node 200 or any other communication system 300 node e.g. comprised in control signals and/or control signalling.

FIG. 4b illustrates an example of a set of predetermined parity encoding codes $MC_1$-$MC_M$ each having a set of offered parity encoding properties $OEP_1$-$OEP_M$ according to an embodiment of the present disclosure. Each predetermined parity encoding code may be associated and/or linked to a set of offered parity encoding properties $OEP_1$-$OEP_M$.

In one example, each candidate parity encoding code $MC_m$, may have an offered information block length k_m, of the candidate parity encoding code $MC_m$ and/or an offered number of encoding parity bits p_m, of the candidate parity encoding code $MC_m$ and/or an offered encoding rate R_m, of the candidate parity encoding code $MC_m$.

A candidate parity encoding code $MC_m$ may be obtained and/or selected from the set of predetermined parity encoding codes $MC_1$-$MC_M$. The set of predetermined parity encoding codes $MC_1$-$MC_M$ may be 802.11n Low-Density Parity Check LDPC codes or any other suitable LDPC codes. The set of predetermined parity encoding codes $MC_1$-$MC_M$ and/or the sets of offered parity encoding properties $OEP_1$-$OEP_M$ may be implemented as a data structure, e.g. stored in memory 106, such as a table and/or a look-up table LUT.

Referring again to FIG. 1, an embodiment of a wireless node 100, 200 for a wireless communication system is provided. The wireless node 100, 200 may comprise processing means 102 configured to obtain the input data v, the set of target parity encoding properties TEP for the input data v and the set of predetermined parity encoding codes $MC_1$-$MC_M$ each having a set of offered parity encoding properties $OEP_1$-$OEP_M$. Obtaining input data v may e.g. comprise calculating the input data v by the processing means 102, receiving the input data v from a second wireless node 200 or any other communication system 300 node or retrieving the input data v from a memory 106 and/or other digital storage medium, in a similar manner, obtaining the set of target parity encoding properties TEP for the input data v may be obtained by calculating TEP by the processing means 102, receiving the TEP from a second wireless node 200 or any other communication system 300 node e.g. as control signals and/or control signalling or retrieving the TEP from the memory 106 and/or other digital storage medium. In a similar manner, the set of predetermined parity encoding codes $MC_1$-$MC_M$ each having a set of offered parity encoding properties $OEP_1$-$OEP_M$, may be obtained by calculating the set of predetermined parity encoding codes $MC_1$-$MC_M$ and/or the respective set of offered parity encoding properties $OEP_1$-$OEP_M$ by the processing means 102, receiving the set of predetermined parity encoding codes $MC_1$-$MC_M$ and/or the respective set of offered parity encoding properties $OEP_1$-$OEP_M$ from a second wireless node 200 or any other communication system 300 node e.g. as control signals and/or control signalling or retrieving the set of predetermined parity encoding codes $MC_1$-$MC_M$ and/or the respective set of offered parity encoding properties $OEP_1$-$OEP_M$ from the memory 106 and/or other digital storage medium.

In one example, obtaining the set of predetermined parity encoding codes $MC_1$-$MC_M$ is performed by obtaining predetermined parity encoding codes $MC_1$-$MC_M$ that have an offered information block length k_m, of the candidate parity encoding code $MC_m$, that is equal to or greater than the target information block length k_0, e.g. by selecting a subset of predetermined parity encoding codes from a set of mother codes stored in the memory or received from the second wireless node. In one further example, the candidate parity encoding code $MC_m$ is then obtained and/or selected if it is further evaluated that the offered number of encoding parity bits p_m, of the candidate parity encoding code $MC_m$, is closest to the target number of encoding parity bits p_0. In one alternative example, the candidate parity encoding code $MC_m$ is obtained and/or selected if it is further evaluated that the offered number of encoding parity bits (p_m), of the candidate parity encoding code (MCm), is equal to or greater than the target number of encoding parity bits p_0.

The processing means 102 may further be operative to and/or configured to obtain input data v having block size and/or length and/or a predefined transport block size TBS.

Further, the target encoding rate and/or target code rate R_0 may be predetermined. The processing means 102 may be operative to set k_0 to TBS if the sets of offered parity encoding properties $OEP_i$, i=1–M, comprises an offered information block length k_i>=TBS and an offered number of encoding parity bits p_i>=p_0. The offered number of encoding parity bits p_i is defined as p_i=n_i–k_i, and may be calculated as p_i=k_i/R_i*(1–R_i) since it is related to the code rate R_i. The processing means 102 may further be operative to and/or configured to perform information block segmentation by splitting the input data into a number of parts j ($v_1, v_2, \ldots, v_j$) each having the same and/or an independent information block length (k_$0_1$, k_$0_2$, ..., k_$0_j$) and each part being processed individually by the method.

In an illustrative example of how conventional methods may obtain the set of target parity encoding properties TEP, e.g. for 802.11n, the target information block length k_0, and the target encoding rate R_0 is signaled to the wireless node as a control signal and/or control signalling. From these and other parameters, the conventional methods determine the block length/number of coded bits n_0 and select the mother code from the set of mother codes that have the same rate R_0 as the desired transmission or, if no predefined mother code with the same rate exist, a mother code with similar rate is selected.

The processing means 102 may further be configured to select and/or determine and/or calculate and/or obtain a candidate parity encoding code $MC_m$ from the set of predetermined parity encoding codes $MC_1$-$MC_M$ by evaluating a set of criteria on the set of target parity encoding properties TEP and the sets of offered parity encoding properties $OEP_1$-$OEP_M$, as further described in relation to FIG. 3. Evaluating the set of criteria may comprise comparing a target information block length k_0 and a target number of encoding parity bits p_0, comprised in the target parity encoding properties TEP, to an offered information block length k_i and an offered number of encoding parity bits p_i, comprised in the offered parity encoding properties $OEP_1$-$OEP_M$. In one example, evaluating the set of criteria on the set of target parity encoding properties (TEP) and the sets of offered parity encoding properties ($OEP_1$-$OEP_M$) may comprise comparing individual parity encoding properties of TEP and $OEP_1$-$OEP_M$ using operators such as relational operators, logical operators or arithmetical operators and optionally combining multiple results from such comparisons of individual parity encoding properties. In an example, evaluating the set of criteria on the set of target parity encoding properties (TEP) and the sets of offered parity encoding properties ($OEP_1$-$OEP_M$) may comprise determining that a candidate parity encoding code $MC_m$ satisfies the criteria: k_m≥k_0 and/or p_m≥p_0, where k_m is the offered information block length, of the candidate parity encoding code $MC_m$ and p_m is the offered number of encoding parity bits, of the candidate parity encoding code $MC_m$.

An illustrative example embodiment of the present disclosure of obtaining or selecting a candidate parity encoding code $MC_m$ is described below:

For each code rate R_i, i=1–M, comprised in the offered parity encoding properties $OEP_1$-$OEP_M$ associated to the set of predetermined parity encoding codes $MC_1$-$MC_M$, select each candidate parity encoding code MCi whose information block length is larger than k_0. In a following step, collect the one or more selected candidate parity encoding codes into a subset of mother codes/predetermined parity encoding codes to use further on in the method. Further, select and/or obtain a candidate parity encoding code $MC_M$ with code rate R_m from the subset of mother codes selected above. Calculate the target number of desired parity bits p_0 for encoding, e.g. as p_0=k_0/R_0*(1–R_0). Select the mother code $MC_M$ with the number of parity bits p_m closest to p_0. In one example, evaluating that the offered number of encoding parity bits p_m is closest to the target number of encoding parity bits p_0 may be performed by evaluating that the offered parity encoding properties $OEP_M$ of the candidate parity encoding code $MC_M$ fulfils the condition |p_0–p_m|=min|p_0–p_i|, where i=1–M. Alternatively described, select the candidate mother code MCi=m that minimizes |p_0–p_i| with index m.

If there are multiple mother codes with the same, minimum, difference between p_0 and p_i, i=1–M, then the method may select the candidate parity encoding code $MC_m$ with the lowest code rate to reduce encoding/decoding complexity and/or the candidate parity encoding code $MC_m$ with the highest code rate to increase performance, such as reducing block error rate. In an alternative embodiment, only parity encoding codes $MC_i$, i=1–M, with p_i>=p_0 is allowed/considered in this step to avoid the need of repetition when rate matching and/or rate matching by performing repetition, as is further described below.

The processing means 102 may further be configured to generate transmission data c_tx by encoding the input data v using the candidate parity encoding code $MC_m$. Generate transmission data c_tx may comprise generating a code word c by applying the candidate parity encoding code $MC_m$ to the input data v.

As previously described, the candidate parity encoding code $MC_m$. may be in the form of a parity-check matrix PCM, and encoding the input data v may be performed using any suitable method known in the art for Low-Density Parity-Check (LDPC) encoding.

The processing means 102 may further optionally be configured to send the transmission data c_tx to a transceiver for emission and/or transmission as a wireless signal comprising the transmission data c_tx it is understood by those skilled in the art that transmitting the bit vector c_tx may include further processing like modulation, OFDM symbol construction, MIMO processing, RF procedure, etc.

The wireless node 100, 200 may further comprise a transceiver 104 configured to emit a wireless signal S comprising the transmission data c_tx. The transceiver 104 may be configured to emit a wireless signal S conforming to a wireless communication system 300, e.g. a wireless communication applying LTE, LTE advanced, code division multiple access (CDMA), time division multiple access (TDMA), frequency division multiple access (FDMA), orthogonal frequency division multiple access (OFDMA), single carrier-frequency division multiple access (SC-FDMA), or other radio access and modulation schemes. CDMA-based systems include those that are based on specifications for Universal Terrestrial Radio Access (UTRA), CDMA2000, etc. UTRA in turn includes Wideband-CDMA (W-CDMA) and other variants of CDMA, while CDMA2000 includes IS-2000, IS-95 and IS-856 standards. Well-known TDMA systems include the Global System for Mobile Communications (GSM), while systems based on OFDMA include Evolved UTRA (E-UTRA), Ultra Mobile Broadband (UMB), IEEE 802.11 family (Wi-Fi), IEEE 802.16 family (WIMAX), IEEE 802.20, Flash-OFDM, etc.

In an embodiment, the processing means 102 may further optionally be configured to determine that there is a mismatch between an offered encoding rate R_m of the candidate parity encoding code $MC_m$ and a target encoding rate R_0, comprised in the target parity encoding properties TEP, and if there is a mismatch between the offered encoding rate R_m and the target encoding rate R_0, to rate match the offered encoding rate R_m of the candidate parity encoding code $MC_m$ by performing a selection of shortening, puncturing and repetition.

Optionally, the processing means 102 may further be configured to determine that there is a match between the offered encoding rate R_m of the candidate parity encoding code $MC_m$ and the target encoding rate R_0, comprised in the target parity encoding properties TEP and adapted to determine that the offered information block length k_m, of the candidate parity encoding code $MC_m$, is greater than the target information block length k_0. If there is a match between the offered encoding rate R_m and the target encoding rate R_0 and the offered information block length k_m is greater than the target information block length k_0, the processing means 102 may further be configured to rate match the offered encoding rate R_m of the candidate parity encoding code $MC_m$ by performing a selection of shortening, puncturing and repetition.

Shortening is a technique to obtain codes of shorter length and lower rate from a given candidate parity encoding code $MC_m$, e.g. an 802.11n LDPC mother code, by adding some information bits of some known values to the input data v. The positions and the values of the added bits are assumed to be available to both encoder and decoder. The known value may e.g. be '0' when encoding, in the decoding process, the fixed bits are given infinite reliability. Rate matching by puncturing on the other hand is a technique where some coded bits are not transmitted, which increases the code rate of a given LDPC mother code. Rate matching by repetition simply means that some of the coded bits are repeated and transmitted more than one time, which decreases the code rate.

In a further embodiment, the processing means 102 may further optionally be configured to check if an offered information block length k_m, of the candidate parity encoding code $MC_M$, exceeds the target information block length k_0. If the offered information block length k_m exceeds the target information block length k_0, shortening will be performed by adding data bits, having the same value, to the input data v. In an embodiment, the processing means 102 may further optionally be configured to generate the transmission data c_tx by further removing the bits of code word c with the corresponding positions of the added bits before emitting/transmitting the wireless signal S.

In an exemplary embodiment of the disclosure, an intermediate information data vector u is used to perform shortening. The intermediate information data vector u may have an information block length of k_m. The intermediate information data vector u is to be used in encoding with mother code m/candidate parity encoding code $MC_m$. Let the block of k_0 information bits of the input data v to be encoded be the bit vector v. That is, the bit vector v contains all or part of the bits of the transport block. The first k_0 bits in the intermediate information data vector u may be set to the information bits v(0), v(1), . . . , v(k_0−1) of the input data v to be transmitted, i.e. u(0)=v(0), u(1)=v(1), . . . , u(k_0−1)=v(k_0−1). Further, if k_0<k_m, then the last (k_m−k_0) information bits is set to 0 before encoding, i.e., u(k_0)=0, . . . , u(k_m−1)=0. This modifies the mother code m/candidate parity encoding code $MC_m$. Here it is assumed that the mother codes/set of predetermined parity encoding codes $MC_1$-$MC_M$ are designed such that optimal shortening is shortening from the end of the intermediate information data vector u. It is understood by those skilled in the art that shortening in other indices of intermediate information data vector u is also possible, e.g., shortening by setting the first (k_m−k_0) information bits to 0 before encoding. After encoding, resulting in the code word c or transmission data c_tx, the bits of the code word c or transmission data c_tx with the corresponding positions of the added bits may be removed to generate the code word c or transmission data c_tx. In an example, vector u has been encoded using candidate parity encoding code $MC_m$ to produce the code word c with a block length of n_m. The transmission data c_tx may be equal to c, i.e. c_tx=c. It is assumed that the mother code m/candidate parity encoding code $MC_m$ is systematic such that first k_m bits of vector c is equal to vector u. The shortening bits, e.g. c(k_0)=u(k_0)=0, . . . , c(k_m−1)=u(k_m−1)=0, are then discarded and/or removed to generate the transmission data c_tx. The transmission data vector c_tx now has length (k_0+p_m).

In a further embodiment, the processing means 102 may further optionally be configured to check if the offered number of encoding parity bits p_m of the candidate parity encoding code $MC_m$, exceeds the target number of encoding parity bits p_0. If the offered number of encoding parity bits p_m exceeds the target number of encoding parity bits p_0 puncturing will be performed by discarding data or parity bits of the transmission data c_tx.

In an illustrating example embodiment, data bits of the transmission data c_tx are discarded by calculating p_m=k_m/R_m*(1−R_m), optionally for each mother code comprised in the set of predetermined parity encoding codes $MC_1$-$MC_M$. If p_0<p_m, the parity bits c_tx (k_0−1+p_0), . . . , c_tx(k_0+p_m−1) are punctured to produce the bit vector c_tx of length n_0. This modifies the mother code m/candidate parity encoding code $MC_m$. Puncturing a code bit means discarding (rather than transmitting) the code bit. Here it is assumed that the mother codes/the set of predetermined parity encoding codes $MC_1$-$MC_M$ are designed for puncturing from the end of the code word c. It is understood by those skilled in the art that puncturing in other indices of code word c is also possible, e.g., puncturing X bits in the beginning of code word c, and puncturing (p_m−p_0−X) bits at the end of code word c.

In a further embodiment, the processing means 102 may further optionally be configured to check if the target number of encoding parity bits p_0 exceeds an offered number of encoding parity bits p_m of the candidate parity encoding code $MC_m$, and if the target number of encoding parity bits p_0 exceeds the offered number of encoding parity bits p_m, to perform repetition by repeating data bits of the transmission data c_tx.

In an illustrating example embodiment, the target number of encoding parity bits exceeds the offered number of encoding parity bits p_m, p_0>p_m. A set of bits, p_0−p_m bits of vector c_tx, will then be repeated to produce the bit vector c_tx of target transmission data length n_0. This modifies the mother code m/candidate parity encoding code $MC_m$. The bits to be repeated may be those towards the beginning of vector c_tx, or those towards the end of vector c_tx, or any bits of vector c_tx that are found to be optimal to repeat.

In an embodiment, the processing means 102 is further operative and/or configured to obtain the set of target parity encoding properties TEP for the input data and/or the set of predetermined parity encoding codes $MC_1$-$MC_M$ and/or the sets of offered parity encoding properties $OEP_1$-$OEP_M$ by receiving a control signal from a second wireless node 200.

In an alternative embodiment, the processing means 102 may further be configured to select and/or determine and/or calculate and/or obtain a candidate parity encoding code $MC_m$ from the set of predetermined parity encoding codes $MC_1$-$MC_M$ by receiving an explicit selection from a second wireless node or any other communication system 300 node e.g. as control signals and/or control signalling or retrieving an explicit selection from a memory and/or other digital storage medium.

In an example using the rate matching mechanism described above, the control channel signaling indicates (a) transport block size TBS, and (b) number of code bits available for transmitting the TB, when assigning resources for transmitting a transport block. The control signaling can be downlink control signaling, similar to the DCI in LTE. The control signaling can also be uplink control signaling, similar to the UCI in LTE. The (a) transport block size TBS, and (b) number of code bits available for transmitting the TB, can be explicitly provided by a field of DCI (or UCI). Alternatively, k_0 and/or n_0 can be implicitly provided, where k_0 and/or n_0 are derivable by other information fields signaled. For example, n_0 is derivable by using the number of resource blocks, the number of resource elements available in a resource block, and the modulation order.

When using the alternative embodiment where an explicit selection from a second wireless node or any other communication system 300 node is received, the rate of the mother code is also signaled using control channel signaling, and is independent from n_0 and k_0. The control channel signaling above is different from existing methods, e.g. in 802.11n, of signaling for LDPC mother code, where the rate of the mother code is explicitly signaled, and n_0 is determined using the rate of the mother code.

In an embodiment, the processing means 102 comprise a processor and a memory and wherein said memory is containing instructions executable by said processor.

In an embodiment, the processing means 102 comprise processing circuitry further comprising a processor and a memory and wherein said memory is containing instructions executable by said processor.

In an embodiment, a wireless node for a wireless communication system 300 is provided. The wireless node, e.g. the first wireless node 100 and/or the second wireless node 200, may comprise processing means configured to receive a wireless signal S comprising transmission data c_tx and/or to obtain the transmission data c_tx. Obtain transmission data may be performed by receiving c_tx from another wireless node or retrieving c_tx from memory. Obtaining a candidate parity encoding code $MC_m$ may be performed in a similar manner as described in relation to FIG. 5-6.

Figure 13:
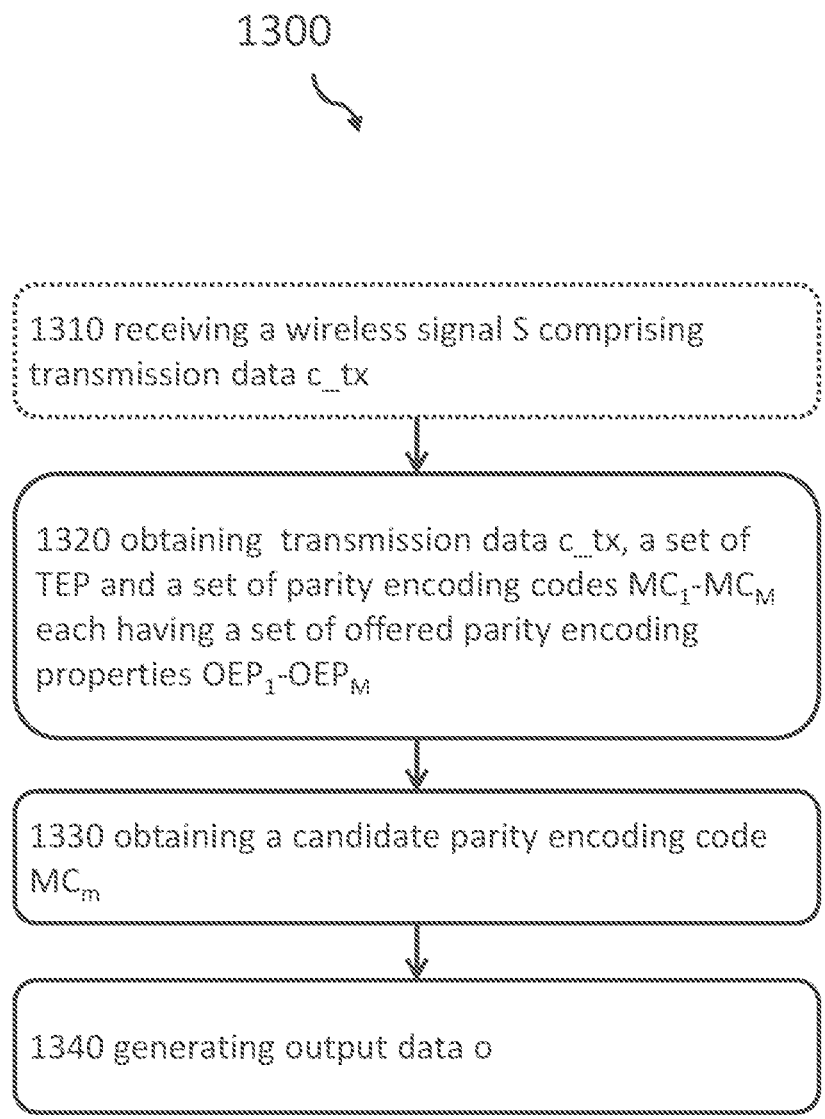
FIG. 13 shows a flowchart of a method for a wireless node according to an embodiment of the present disclosure.

FIG. 13 shows a flowchart of a method 1300 for a second wireless node according to an embodiment of the present disclosure. The method may comprise obtaining 1320 transmission data c_tx, obtaining a set of target parity encoding properties TEP for the transmission data c_tx and a set of predetermined parity encoding codes $MC_1$-$MC_M$ each having a set of offered parity encoding properties $OEP_1$-$OEP_M$. The transmission data c_tx may optionally be obtained by receiving 1310 the transmission data c_tx comprised in a wireless signal S, e.g. from the first wireless node. The method may further comprise obtaining 1330 a candidate parity encoding code $MC_m$ from the set of predetermined parity encoding codes $MC_1$-$MC_M$ by evaluating a set of criteria on the set of target parity encoding properties TEP and the sets of offered parity encoding properties $OEP_1$-$OEP_M$, wherein evaluating the set of criteria comprises comparing a target information block length k_0 and a target number of encoding parity bits p_0, comprised in the target parity encoding properties TEP, to an offered information block length k_i and an offered number of encoding parity bits p_i, comprised in the offered parity encoding properties $OEP_1$-$OEP_M$, and generate output data o by decoding the transmission data c_tx using the candidate parity encoding code $MC_m$. Before decoding, any shortened and punctured bits must be added to the received bits. The shortened bits may be given high reliability while the punctured bits may be given zero reliability.

In one embodiment, the candidate parity encoding code $MC_m$ is obtained if it is evaluated that an offered information block length k_m, of the candidate parity encoding code $MC_m$, is equal to or greater than the target information block length k_0.

In one embodiment, the candidate parity encoding code $MC_m$ is obtained if it is further evaluated that an offered number of encoding parity bits p_m, of the candidate parity encoding code $MC_m$, is closest to the target number of encoding parity bits p_0. The offered number of encoding parity bits p_m may be closest to the target number of encoding parity bits p_0 of all the offered number of encoding parity bits p_i of the sets of offered parity encoding properties OEP1-OEPM.

In one embodiment, the candidate parity encoding code $MC_m$ is obtained if it is evaluated that the offered number of encoding parity bits p_m, of the candidate parity encoding code $MC_m$, is equal to or greater than the target number of encoding parity bits p_0.

Referring again to FIG. 1, the processing means may further be configured to generate output data o by decoding the transmission data c_tx using a candidate parity encoding code $MC_m$. As previously described, the candidate parity encoding code $MC_m$ may be a parity-check matrix PCM and decoding the output data o may be performed using any suitable method known in the art for Low-Density Parity-Check LDPC decoding. The output data may be identical to input data v, wherein input data v was used to generate the transmission data c_tx by applying the candidate parity encoding code $MC_m$ to the input data v.

In an example, the first wireless node 100 generates the transmission data c_tx by applying the candidate parity encoding code $MC_M$ to the input data v and emits and/or transmits a wireless signal S comprising the transmission data to the second wireless node 200. The second wireless node 200 may then generate output data o by decoding the received transmission data c_tx using the candidate parity encoding code $MC_M$.

In an embodiment, the processing means 102 is configured to obtain a set of target parity encoding properties TEP for the output data o and a set of predetermined parity encoding codes $MC_1$-$MC_M$ each having a set of offered parity encoding properties $OEP_1$-$OEP_M$. Obtaining the set of target parity encoding properties TEP for the output data o may be obtained by calculating of the processing means, receiving the TEP from another wireless node or any other communication system 300 node e.g. as control signals and/or control signalling or retrieving the TEP from a memory and/or another digital storage medium. In a similar manner, obtaining the set of predetermined parity encoding codes $MC_1$-$MC_M$ each having a set of offered parity encoding properties $OEP_1$-$OEP_M$ associated to/with and/or linked to it, may be obtained by calculating the set of predetermined parity encoding codes $MC_1$-$MC_M$ and/or the respective set of offered parity encoding properties $OEP_1$-$OEP_M$ by the processing means, receiving the set of predetermined parity encoding codes $MC_1$-$MC_M$ and/or the respective set of offered parity encoding properties $OEP_1$-$OEP_M$ from another wireless node or any other communication system 300 node e.g. as control signals and/or control signalling or retrieving the set of predetermined parity encoding codes $MC_1$-$MC_M$ and/or the respective set of offered parity encoding properties $OEP_1$-$OEP_M$ from the memory and/or other digital storage medium.

In an embodiment, the processing means may further be configured to select and/or determine and/or calculate and/or obtain a candidate parity encoding code $MC_m$ from the set of predetermined parity encoding codes $MC_1$-$MC_M$ by evaluating a set of criteria on the set of target parity encoding properties TEP and the sets of offered parity encoding properties $OEP_1$-$OEP_M$, wherein evaluating the set of criteria comprises comparing a target information block length k_0 and a target number of encoding parity bits p_0, comprised in the target parity encoding properties TEP, to an offered information block length k_i and an offered number of encoding parity bits p_i, comprised in the offered parity encoding properties $OEP_1$-$OEP_M$. In an alternative embodiment, the processing means may further be configured to select and/or determine and/or calculate and/or obtain a candidate parity encoding code $MC_m$ from the set of predetermined parity encoding codes $MC_1$-$MC_M$ by receiving an explicit selection from another wireless node or any other communication system 300 node e.g. as control signals and/or control signalling or retrieving an explicit selection from a memory and/or other digital storage medium.

The wireless node may further comprise a transceiver configured to receive a wireless signal S comprising the transmission data c_tx. The processing means may further optionally be configured to receive transmission data c_tx via the transceiver. It is understood by those skilled in the art that receiving the bit vector c_tx may include further processing like demodulation, OFDM symbol deconstruction, MIMO processing, RF procedure, etc.

In an embodiment, the first wireless node is configured to receive the wireless signal S and/or the second wireless node 200 is configured to send the wireless signal S. In yet an embodiment, the first wireless node is configured to transmit and/or emit the wireless signal S and/or the second wireless node 200 is configured to receive the wireless signal S.

In an illustrating example embodiment, when the transmission data c_tx has been received, it is decoded using the parity check matrix corresponding to the mother code m/candidate parity encoding code $MC_m$. Therefore, the decoding complexity depends on the block length of a code word c rather than the length of the transmitted bit vector c_tx.

Figure 5:
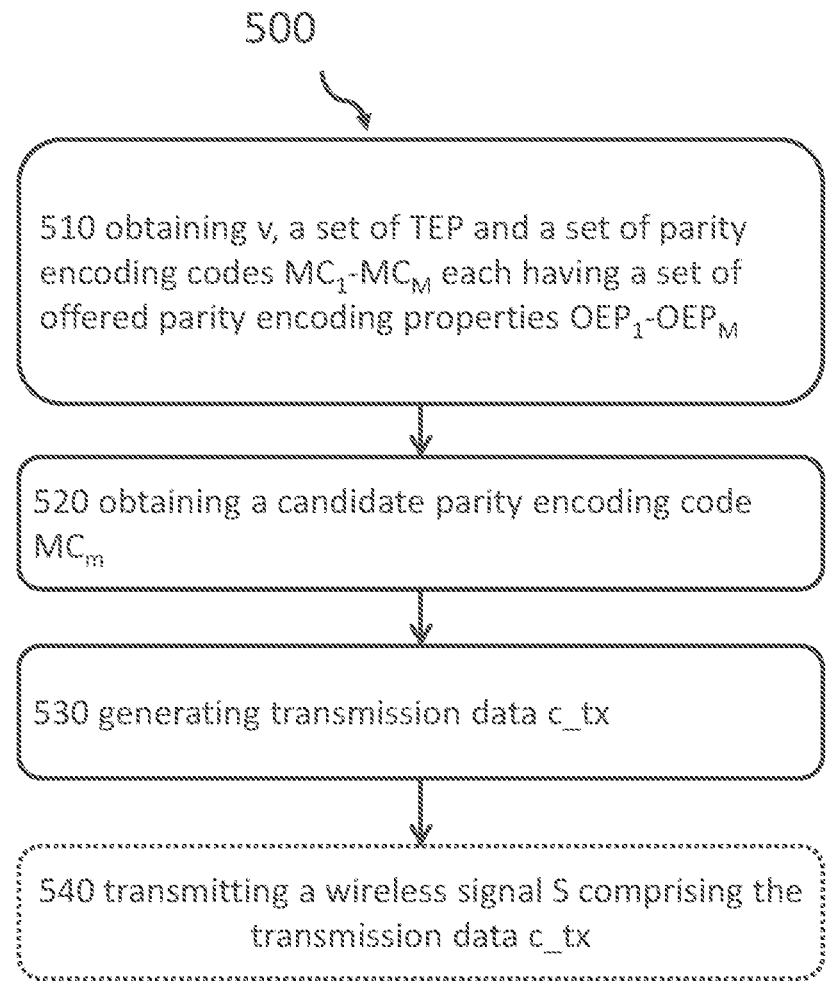
FIG. 5 shows a flowchart of a method for a first wireless node according to an embodiment of the present disclosure.

FIG. 5 shows a flowchart of a method for a wireless node according to an embodiment of the present disclosure. In an embodiment, a method 500 for a wireless node 100, 200 for a wireless communication system 300 is provided. The method 500 comprising: Step 510: obtaining input data v, a set of target parity encoding properties TEP for the input data v and a set of predetermined parity encoding codes $MC_1$-$MC_M$ each having a set of offered parity encoding properties $OEP_1$-$OEP_M$.

Step 520: obtaining and/or selecting a candidate parity encoding code $MC_m$ from the set of predetermined parity encoding codes $MC_1$-$MC_M$ by evaluating a set of criteria on the set of target parity encoding properties TEP and the sets of offered parity encoding properties $OEP_1$-$OEP_M$, wherein evaluating the set of criteria comprises comparing a target information block length k_0 and a target number of encoding parity bits p_0, comprised in the target parity encoding properties TEP, to an offered information block length k_i and an offered number of encoding parity bits p_i, where i=1–M, comprised in the offered parity encoding properties $OEP_1$-$OEP_M$.

Step 530: generating transmission data c_tx by encoding the input data v using the candidate parity encoding code $MC_m$.

Optional step 540: emitting and/or transmitting a wireless signal S comprising the transmission data c_tx, e.g. to the second wireless node and/or any other network node of the wireless communication system 300.

In an embodiment, the method 500 further comprising obtaining the candidate parity encoding code $MC_m$ if it is evaluated that an offered information block length k_m, of the candidate parity encoding code $MC_m$, is equal to or greater than the target information block length (k_0).

In one example, a subset of mother codes from a total set of mother codes retrieved from memory or received from another wireless node is obtained or selected. This has at least the effect to ensure that the information block length offered when using the candidate parity encoding code $MC_m$ is sufficient to accommodate the input data v.

The method may further comprise obtaining the candidate parity encoding code $MC_m$ if it is further evaluated that an offered number of encoding parity bits p_m, of the candidate parity encoding code $MC_m$, is closest to the target number of encoding parity bits p_0.

In an example, the target number of encoding parity bits p_0=5 and the offered number of encoding parity bits p_1=20, p_2=15, p_3=10. The encoding code $MC_3$ would then be obtained as p_3 is closest to p_0, e.g. calculated as the distance |p_3−p_0|. This embodiment has at least the advantage of reducing block-error rates by selecting the best suited mother code in the set of specified mother codes.

The method may further comprise obtaining the candidate parity encoding code ($MC_M$) only if it is evaluated that the offered number of encoding parity bits (p_m), of the candidate parity encoding code $MC_M$, is equal to or greater than the target number of encoding parity bits p_0. This embodiment has at least the advantage that the performance may be increased, in terms of reduced block-error-rates, by eliminating the need for rate matching by performing repetition.

Figure 6:
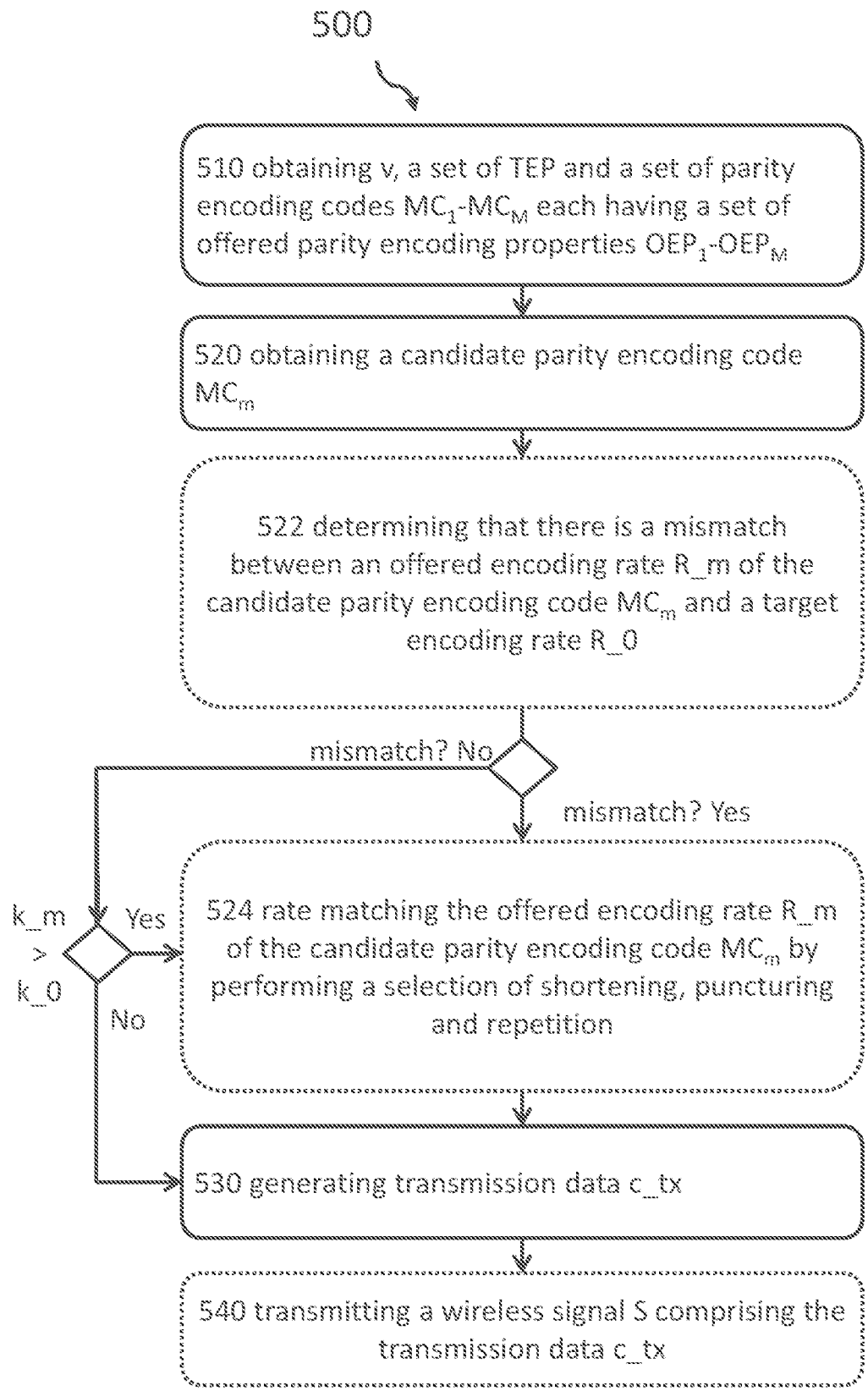
FIG. 6 shows a flowchart of a method for a first wireless node according to a further embodiment of the present disclosure.

FIG. 6 shows a flowchart of a method for a first wireless node according to a further embodiment of the present disclosure. In an embodiment, the method 500, described in relation to FIG. 5, is further comprising the optional steps:

determining 522 that there is a mismatch between an offered encoding rate R_m of the candidate parity encoding code $MC_m$ and a target encoding rate R_0, comprised in the target parity encoding properties TEP, and if there is a mismatch between the offered encoding rate R_m and the target encoding rate R_0, rate matching 524 the offered encoding rate R_m of the candidate parity encoding code $MC_m$ by performing a selection of shortening, puncturing and repetition.

Optionally, the method further comprises determining that there is a match between the offered encoding rate R_m, of the candidate parity encoding code $MC_M$, and the target encoding rate R_0, comprised in the target parity encoding properties TEP, and to further determine that the offered information block length k_m, of the candidate parity encoding code $MC_M$, is greater than the target information block length k_0, and if there is a match between the offered encoding rate R_m and the target encoding rate R_0 and the offered information block length k_m is greater than the target information block length k_0, rate matching the offered encoding rate R_m of the candidate parity encoding code $MC_M$ by performing a selection of shortening, puncturing and repetition. In an embodiment, the method 500 further comprises determining that and/or checking if an offered information block length k_m, of the candidate parity encoding code $MC_M$, exceeds the target information block length k_0 and if the offered information block length k_m exceeds the target information block length k_0, performing shortening by adding data bits, having the same value, to the input data v.

In an embodiment, the method 500 further comprises determining that and/or checking if an offered number of encoding parity bits p_m of the candidate parity encoding code $MC_m$, exceeds the target number of encoding parity bits p_0 and if the offered number of encoding parity bits p_m exceeds the target number of encoding parity bits p_0, performing puncturing by discarding parity or data bits of the code word c or transmission data c_tx.

In an embodiment, the method 500 further comprises determining that and/or checking if the target number of encoding parity bits p_0 exceeds an offered number of encoding parity bits p_m of the candidate parity encoding code $MC_m$, and if the target number of encoding parity bits p_0 exceeds the offered number of encoding parity bits p_m, performing repetition by repeating data and/or systematic and/or parity bits of the transmission data c_tx.

In an embodiment, obtaining the set of target parity encoding properties TEP for the input data and/or the set of predetermined parity encoding codes $MC_1$-$MC_M$ and/or the sets of offered parity encoding properties $OEP_1$-$OEP_M$ comprises receiving a control signal from a second wireless node 200.

Figure 7:
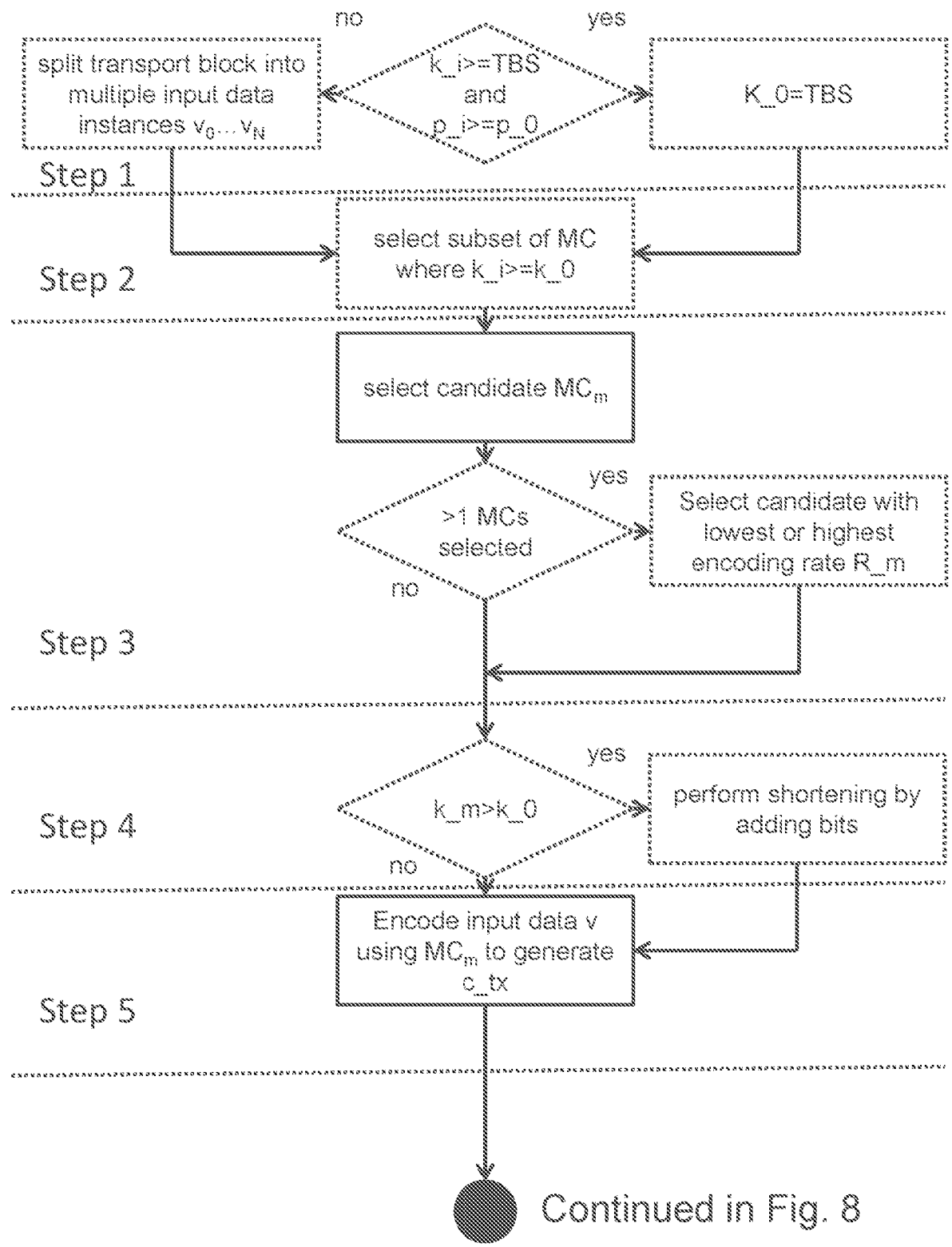
FIG. 7 shows a first part of a flowchart of a method for a first wireless node according to a further embodiment of the present disclosure.

FIG. 7 shows a first part of a flowchart of a method for a first wireless node according to a further embodiment of the present disclosure. The method comprising the steps:

Step 1, optionally perform code block segmentation/information block segmentation. The Transport Block Size, TBS, as well as the desired code rate for encoding, R_0, may be known before the start of the method. For each, e.g. predetermined, mother code/parity encoding code $MC_i$, check if the condition (k_i>=TBS) is satisfied, optionally calculate the offered number of encoding parity bits p_i=k_i/R_i*(1-R_i). Further, checking or evaluating a condition. If there exists a mother code/parity encoding code $MC_i$ with (k_i>=TBS), then set k_0=TBS and else perform code block segmentation/information block segmentation by splitting transport block into multiple input data instances $v_0 \ldots v_N$ to produce two or more code blocks, and perform the rate matching, including steps 2-6 described below, for each code block individually. Note that the code blocks may or may not all have the same info block length k_0, and may or may not have the same code block length n_0. For each of the code blocks, the info block size may be k_0.

Step 2 select and/or obtain candidate parity encoding codes.

For each code/encoding rate R_i available in the set of mother codes i=1, ..., M/set of predetermined parity encoding code $MC_1$-$MC_M$, select and/or obtain the mother code/candidate parity encoding codes m_i whose info block lengths are larger than or equal to k_0. Collect the selected mother codes m_i into a subset of mother codes to use in Steps 3-6.

Step 3 Select and/or obtain a mother code m with code rate R_m from the subset of mother codes selected in step 2 a) Calculate the number of desired parity bits for encoding/target number of encoding parity bits p_0 that corresponds to the desired/target code rate R_0

$$p\_0/R\_0*(1-R\_0).$$

b) For each candidate parity encoding code $MC_i$, calculate the offered number of encoding parity bits p_i=k_i/R_i*(1-R_i)

c) Select and/or obtain the mother code m/candidate parity encoding code $MC_m$ with the number of parity bits p_m closest to p_0:|p_0-p_m|=min|p_0-p_i|. If there are multiple mother codes with the same, minimum, difference between p_0 and p_i, select the mother code m with the lowest code rate. An alternative is to allow only mother codes with p_i>=p_0 in this step to avoid the need of repetition in Step 6 below.

Step 4 shortening

Let the information vector be vector u of length k_m. Vector u is to be used in encoding with mother code m/candidate parity encoding code $MC_m$. Let the block of k_0 information bits to be encoded be the input data bit vector v. That is, the bit vector v contains the bits of the transport block+any additional cyclic redundancy check bits. Set the first k_0 bits in the intermediate information data vector u to the info bits v(0), v(1), ..., v(k_0-1) to be transmitted, u(0)=v(0), u(1)=v(1), ..., u(k_0-1)=v(k_0-1). If k_0<k_m, set the last (k_m-k_0) information bits to 0 before encoding, i.e., u(k_0)=0, ..., u(k_m-1)=0. This modifies the mother code m/candidate parity encoding code $MC_m$. Here it is assumed that the mother codes/set of predetermined parity encoding codes $MC_1$-$MC_M$ are designed such that optimal shortening is shortening from the end of the block of information bits in the intermediate information data vector u. It is understood by those skilled in the art that shortening in other indices of vector u is also possible, e.g., shortening by setting the first (k_m-k_0) information bits to 0 before encoding.

Step 5 generate transmission data by performing encoding

Encoding is performed using the intermediate information data vector with length equal to the offered block length k_m u and mother code m/candidate parity encoding code $MC_m$, and produce the code word bit vector c. The code word c has length n_m.

Figure 8:
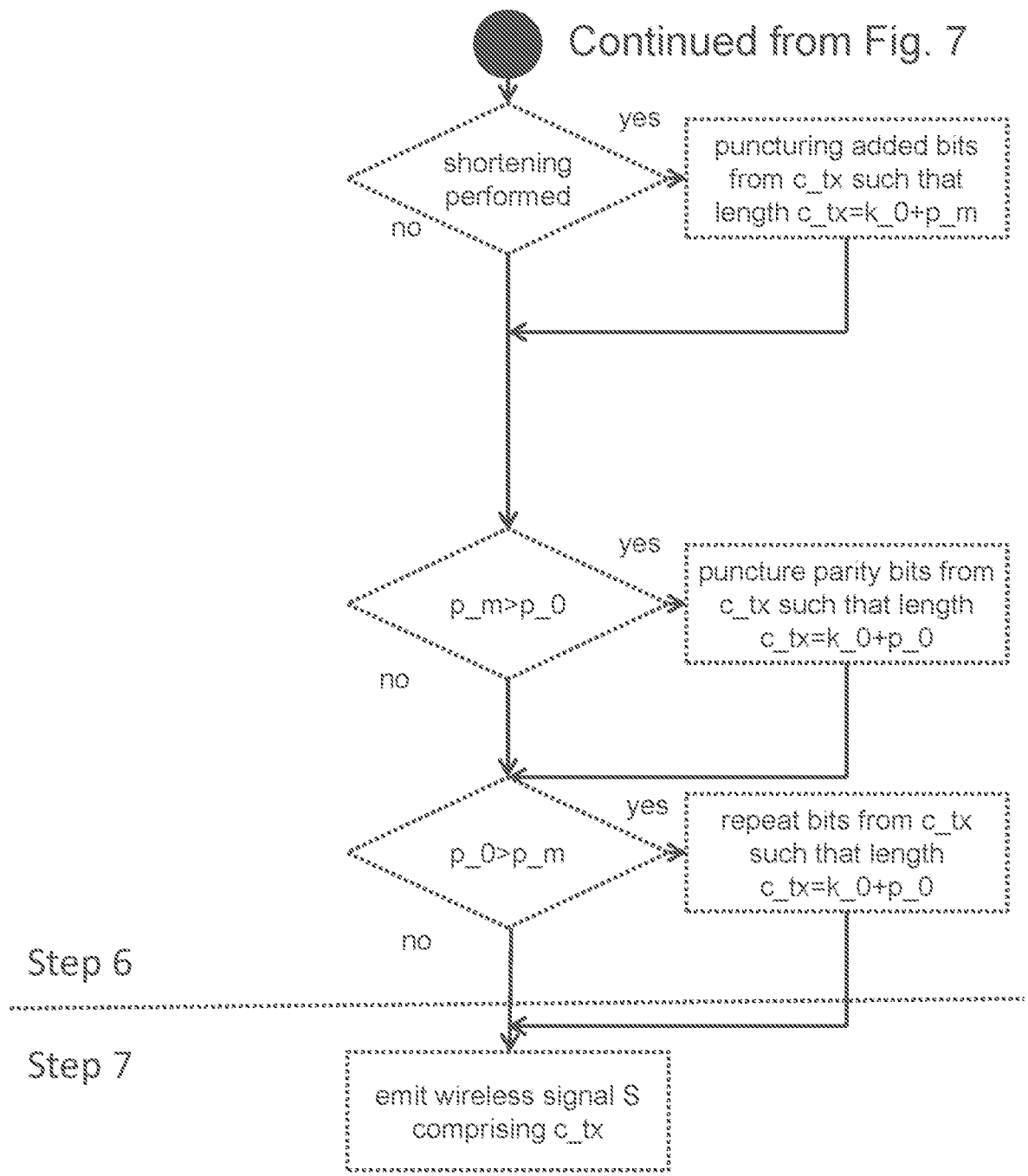
FIG. 8 shows a second part of a flowchart of a method for a first wireless node according to a further embodiment of the present disclosure.

FIG. 8 shows a second part of a flowchart of a method for a first wireless node according to a further embodiment of the present disclosure. The method further comprising:

Step 6: rate match by performing puncturing and repetition.

Remove the shortened bits and perform puncturing and/or repetition to produce the transmission data bit vector c_tx of length n_0 for transmission. Let c_tx=c. Assuming the mother code m/candidate parity encoding code $MC_m$ is systematic such that first k_m bits of vector c is equal to intermediate information data vector u, discard the shortening bits c_tx(k_0)=u(k_0)=0, ..., c_tx(k_m-1)=u(k_m-1)=0. The vector c_tx now has length (k_0+p_m). Then process the parity bits using the following.

Calculate p_m=k_m/R_m*(1-R_m) (preferably pre-calculated for each mother code in the subset of mother codes selected in Step 1). If p_0<p_m, puncture parity bits c_tx(k_0-1+p_0), ..., c_tx(k_0+p_m-1) to produce the transmission data bit vector c_tx of length n_0. This modifies the mother code ml candidate parity encoding code $MC_m$. Puncturing a code bit means discarding (rather than transmitting) the code bit. Here it is assumed that the mother codes are designed for puncturing from the end of code word vector c. It is understood by those skilled in the art that puncturing in other indices of vector c is also possible, e.g., puncturing X bits in the beginning of code word vector c, and puncturing (p_m-p_0-X) bits at the end of code word vector c.

If p_0>p_m, repeat p_0-p_m bits of transmission data vector c_tx to produce the transmission data bit vector c_tx of length n_0. This modifies the candidate parity encoding code $MC_m$/mother code m. The bits to be repeated can, for example, be those towards the beginning of transmission data vector c_tx, or those towards the end of transmission data vector c_tx.

Step 7 emit/transmit transmission data.

Transmit the transmission data bit vector c_tx. It is understood by those skilled in the art that transmitting the bit vector c_tx may include further processing like modulation, OFDM symbol construction, MIMO processing, RF procedure, etc.

Step 8 decoding (performed in the receiving wireless node, not shown in the figure)

When the code word/transmission data c_tx has been received, it is decoded using the parity check matrix corresponding to the mother code m/candidate parity encoding code $MC_m$. Therefore, the decoding complexity depends on the length of the code word c rather than the length of the transmitted bit vector c_tx.

As an alternative embodiment to step 3, the rate of the mother code selected in step 3 can be explicitly signaled. From the smaller set of mother codes with this rate/predetermined parity encoding codes $MC_i$ with this rate, whose info block lengths are larger than or equal to k_0, then the mother code used for transmission is the one with smallest information block length k_m.

Figure 9:
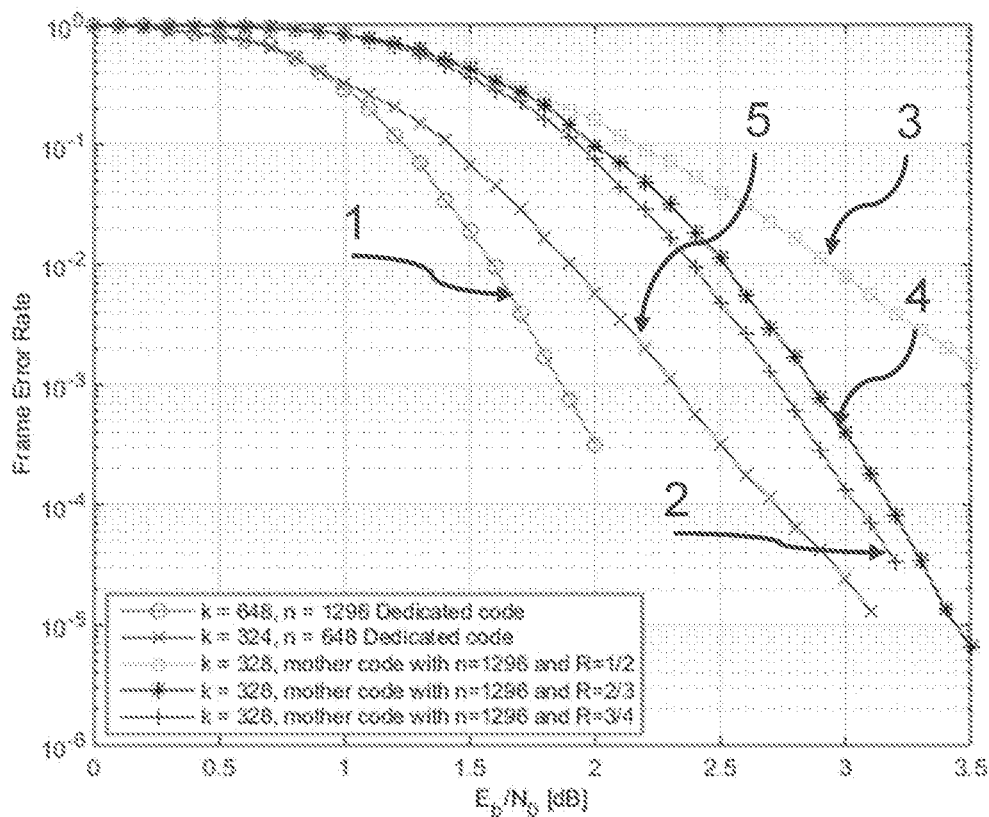
FIG. 9 shows a graph illustrating performance for different candidate parity encoding codes.

FIG. 9 shows a graph illustrating performance for different candidate parity encoding codes rate matched through shortening and puncturing. Curve 1 shows the performance for a dedicated code, i.e. no rate matching is performed, with code block length n=1296 and information block length k=328. Curve 2 shows the performance for a dedicated code with code block length n=648 and information block length k=324. Curve 3-5 shows the performance of 3 codes that are derived by rate matching. The vertical axis shows frame error rates (also called block error rates) ranging from $10^{-6}$ at the bottom of the axis to $10^0$ at the top of the axis. The horizontal axis shows signal to noise ratio, $E_b/N_0$, in dB, ranging from 0 on the left end of the axis to 3.5 at the right end of the axis.

In an example embodiment of the disclosure it is assumed that a set of M mother codes MC with offered information block lengths k_i (i=1, . . . , M) and offered encoding/coding rates R_i (i=1, . . . , M) are specified. It is assumed that a code having an offered information block length k_0 and encoding/coding rate R_0 is desired, but it is not available in the set of mother codes $MC_1$-$MC_M$ without performing code modification/rate matching. Hence, the code to use for encoding of k_0 information bits with rate R_0 is derived by the steps:

selecting and/or obtaining a candidate parity encoding code $MC_m$ from the set of mother codes $MC_1$-$MC_M$. In an example where LDPC codes are used as parity encoding codes, this step selects and/or obtains the suitable parity check matrix $H_m$, and modifying/rate matching the selected candidate parity encoding code $MC_m$ via code adjustment/rate matching, e.g. including shortening, puncturing and repetition. The inventors have realized by performing simulations that performance, e.g. block/frame error rates, is improved if the candidate parity encoding code $MC_m$ is selected where the number of offered number of encoding parity bits p_m matches the number of parity bits needed for encoding, i.e. the target number of encoding parity bits p_0, as close as possible. In other words, the candidate parity encoding code $MC_m$ should be selected from the set of predetermined parity encoding codes $MC_1$-$MC_M$ such that puncturing of code bits is minimized. The performance loss resulting from rate matching by shortening is thus less than the performance loss resulting from rate matching by puncturing. The impact of using the present method of selecting and/or obtaining candidate parity encoding code $MC_m$ from a set of LDPC codes used in 802.11n is shown in FIG. 9. The figure shows first the performance of two different mother codes, curves 1-2, where the mother code is a dedicated mother code designed to give an offered information block length k_m and an offered encoding rate/coding rate R_m without code modification/rate matching. The two mother codes are: (1) encoding rate R=½ LDPC code for information block length k=648 bits and code block length n=1296 bits; (2) rate R=½ LDPC code for information block length k=324 bits and code block length n=648 bits. FIG. 9 also shows the performance of 3 derived codes, each derived code having rate R=½, information block length k_0=328 bits and code block length n_0=656 bits (hence parity bit size p_0=n_0-k_0=328 bits). The derived codes, curve (3)-(5), are obtained as follows:

Select the mother code with n=1296 bits and R=½ (hence information block size k_m=n_m*R_m=648 bits, parity bit size p_m=n_m-k_m=648 bits). Modify/rate match this mother code by shortening k_m-k_0=648-328=320 bits, and puncturing p_m-p_0=648-328=320 bits, to arrive at the derived code with performance shown by curve 3 in FIG. 9.

Select the mother code with n=1296 bits and R=⅔ (hence information block size k_m=n_m*R_m=864 bits, parity bit size p_m=n_-k_m=432 bits). Modify/rate match this mother code by shortening k_m-k_0=864-328=536 bits, and puncturing p_m-p_0=432-328=104 bits, to arrive at the derived code with performance shown by curve 4 in FIG. 9.

The inventors have further realized that since it has been shown that using a high rate mother code with a minimum of puncturing gives a code with better performance, it can be assumed that it can be worthwhile to use an even higher mother code rate given that only a low number of parity bits are not defined. Instead of these parity bits, a few bits can be repeated to give the desired code rate. This can be visualized in the following example embodiment:

Select the candidate parity encoding code $MC_m$ with n=1296 bits and R=¾ (hence offered information block length k_m=n_m*R_m=972 bits, offered number of encoding parity bits p_m=n_m-k_m=324 bits), Modify this candidate parity encoding code $MC_m$ by shortening k_m-k_0=(972-328)=644 bits, and puncturing p_m-p_0=324-328=-4 bits. Note here that 4 parity bits are missing (a negative number of bits should be punctured), that is, the candidate parity encoding code $MC_m$ has fewer parity bits than the wanted code. Therefore, instead of puncturing, 4 bits (systematic or parity) are repeated to arrive at the derived code with performance shown by curve (5).

In the description of the 802.11n LDPC code, the rate matching procedure is applied to a candidate parity encoding code $MC_m$ of the same rate as the target/desired code, in this case, this corresponds to the third curve (3) (i.e., mother code with n=1296 bits and R=½) in the plot with worst performance. As can be seen in the figure, performance is improved when a mother code with higher code rate is used instead, where puncturing of parity bits of the LDPC code is reduced.

FIG. 10 shows a table illustrating a set of predetermined parity encoding codes according to an embodiment of the present disclosure. The predetermined parity encoding codes in an example are a set of IEEE 802.11n LDPC codes with information block length in bits 1020: k=(324, 432, 486, 540, 648, 864, 972, 1080, 1296, 1458, 1620), codeword block length 1030: n=(648, 1296, 1944), encoding rate 1010 R=(½, ⅔, ¾, ⅚), with modulation {QPSK, 16-QAM, 64QAM}, as specified in IEEE Std 802.11-2012, Part 11: Wireless LAN Medium Access Control (MAC) and Physical Layer (PHY) Specifications, Sec. 20.3.11.7 and Annex F.

In an example, the proposed method in the present disclosure is used to select a candidate parity encoding code $MC_m$ for encoding an information block/input data v of size k_0=328 bits into a code word block and/or code block of size n_0=656 bits. The target number of encoding parity bits is p_0=328 bits. Transport block size TBS=k_0=328 bits.

Optionally information block segmentation may be performed. Since the TBS is small, the code block segmentation/information block segmentation step is transparent.

Select the subset of predetermined parity encoding codes that satisfy k_i>=k_0. This may be performed for each of the 4 code rates available R=(½, ⅔, ¾, ⅚) one at a time. For R=½, select the candidate parity encoding code $MC_{1-2}$ of {R=½, (k=972, 648)}, since k=972 and 648 are larger than k_0=328. In this example, $MC_i$ corresponds to the i-th mother code in the table of FIG. 10. For R=⅔, select the candidate parity encoding code $MC_{4-6}$ of {R=⅔, (k=1296, 864, 432)}, since k=1296, 864, 432 are larger than k_0=328. For R=¾, select the mother code/candidate parity encoding code $MC_{7-9}$ of {R=¾, (k=1458, 972, 486)}, since k=1458, 972, 486 are larger than k_0=328. For R=⅚, select the mother code/candidate parity encoding code $MC_{10-12}$ of {R=⅚, (k=1620, 1080, 540)}, since k=1620, 1080, 540 are larger than k_0=328.

Select the candidate parity encoding code $MC_m$ with code rate R_m from the subset of mother codes $MC_1$-$MC_2$ and $MC_4$-$MC_{12}$. For each of the mother codes in the subset $MC_1$-$MC_2$ and $MC_4$-$MC_{12}$ selected above, calculate the number of parity bits p:

For the mother codes $MC_{1-2}$ of {R=½, k=(972, 648)}, p=(972, 648), respectively;

For the mother codes $MC_{4-6}$ of {R=⅔, k=(1296, 864, 432)}, p=(648, 432, 216), respectively;

For the mother codes $MC_{7-9}$ of {R=¾, (1458, 972, 486)}, p=(486, 324, 162), respectively.

For the mother codes $MC_{10-12}$ of {R=⅚, k=(1620, 1080, 540)}, p=(324, 216, 108), respectively.

The desired number of parity bits/target number of encoding parity bits p_0=328 bits;

There are 2 candidate parity encoding codes $MC_m$ with p_i closest to p_0=328 bits:

$MC_8$ {R=¾, k=972, p=324}

$MC_{10}$ {R=⅚, k=1620, p=324}

Select the candidate parity encoding code $MC_m$ with lowest code rate in the above:

$MC_8$ {R_m=¾, k_m=972, p_m=324}.

Performing shortening. The information vector u may be of length k_m=972. Vector u is to be used in encoding with mother code m. Let the block of k_0=328 information bits to be encoded be the bit vector v/input data v. That is, the bit vector v contains the 328 bits of the transport block. Set the first k_0 bits in the information vector u to the info bits v(0), v(1), . . . , v(k_0−1) to be transmitted/emitted, u(0)=v(0), u(1)=v(1), . . . , u(327)=v(327). Set the last (k_m−k_0)= (972−328)=644 information bits to 0 before encoding, i.e., u(328)=0, . . . , u(971)=0.

Further, perform encoding using the length-972 info vector u and candidate parity encoding code $MC_{m3}$ {R=¾, k=972, p=324}, and produce the length-1296 code word bit vector c.

Further, set c_tx=c. Assuming the candidate parity encoding code $MC_m$ is systematic such that first 972 bits of code word c is equal to vector u, discard the shortening bits c_tx(328)=u(328)=0, . . . , c_tx(971)=u(971)=0. Then repetition is to be performed, since p_0=328, p_m=324, p_0>p_m. Repeat p_0−p_m=4 bits of code word c to produce the bit vector c_tx. Bit vector c_tx has length 328+323=656 bits.

Further transmit the transmission data bit vector c_tx.

In the second wireless node.

Decode the received bit vector using the parity-check matrix corresponding to the mother code {R_m=¾, k_m=972, p_m=324}.

With reference to the selection step, one solution is to select the mother code with the lowest rate in case there are several options with the same minimum difference between p_i and p_0 to choose from. The reason for this is to keep the complexity down, since using a mother code with larger R_m, and thereby a longer code word length c_m, gives higher decoding complexity. The performance may however be slightly better if the highest code rate (corresponding to a longer mother code block length) is selected, as shown in FIG. 11.

Figure 11:
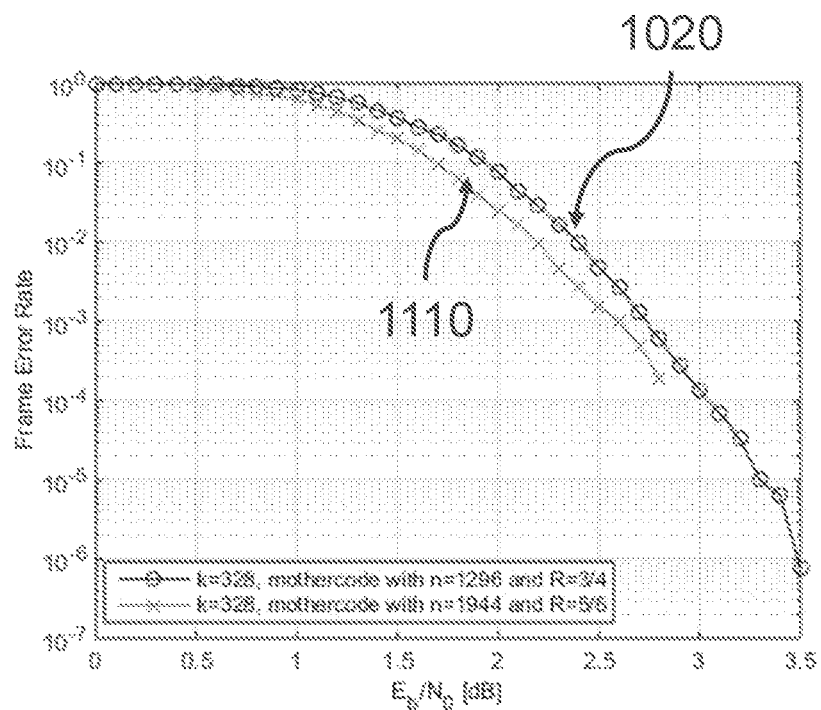
FIG. 11 shows a graph illustrating performance after rate matching of candidate parity encoding codes having a higher and lower encoding rate and a shorter and longer information block length.

FIG. 11 shows the performance of the two different codes with k=328 and R=½ that have been constructed through modification/rate matching of the two mother codes/candidate parity encoding codes remaining in the selecting step above through shortening and puncturing. The vertical axis shows block error rates ranging from $10^{-7}$ at the bottom of the axis to $10^0$ at the top of the axis. The horizontal axis shows signal to noise ratio, $E_b/N_0$ in dB, ranging from 0 on the left end of the axis to 3.5 at the right end of the axis. The performance of the first code 1110 having a mother code with n=1944 and R=⅚ is shown in FIG. 11 together with the performance of the second code 1120 having a mother code with n=1296 and R=¾.

Both mother codes shown here have 324 parity bits, but the performance is slightly better when modifying the higher rate mother code. In step 4 and 6 above, it is assumed that the mother codes/parity encoding codes are designed such that it is optimal to shorten bits from the end of the block of information bits and that it is optimal to puncture bits from the end of the code word. Even if this is not the case it does not impact the selection of the mother code/candidate parity encoding code $MC_m$. For example, it is possible to rearrange the bits (corresponding to the variable nodes of the graph) in the code word such that it will be optimal to shorten and puncture from the end as described. Other shortening or puncturing patterns may also be applied without impact on the fundamental choice of mother code.

Typically, code block segmentation/information block segmentation is applied when the transport block is longer than the largest possible code block, as shown in Step 1. In this case, the proposed method for selection of mother code rate may be applied after code block segmentation/information block segmentation. The target number of encoding parity bits p_0 for the encoding of each code block is calculated and the optimal mother code/candidate parity encoding code $MC_m$ may be selected based on the code block that needs the largest number of parity bits, according to the above method. This mother code/candidate parity encoding code $MC_m$ may be used for all code blocks corresponding to the same transport block for simplicity.

Figure 12:
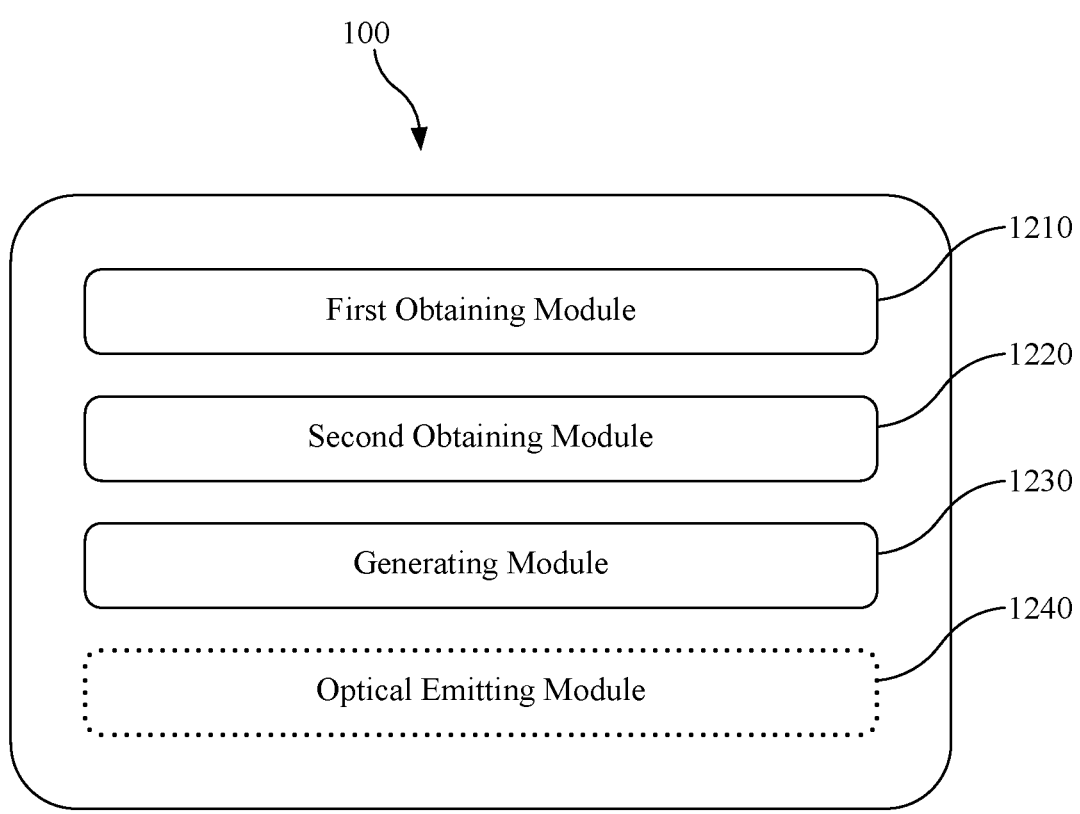
FIG. 12 shows a wireless node according to an embodiment of the present disclosure.

FIG. 12 shows a wireless node 100, 200 according to an embodiment of the present disclosure. A wireless node for a wireless communication system 300 is provided, the wireless node interacting with other wireless nodes. The wireless node 100, 200 may comprise:

a first obtaining module 1210 configured to obtain input data v, a set of target parity encoding properties TEP for the input data v and a set of predetermined parity encoding codes $MC_1$-$MC_M$ each having a set of offered parity encoding properties $OEP_1$-$OEP_M$, a second obtaining and/or selecting module 1220 configured to select and/or obtain a candidate parity encoding code $MC_M$ from the set of predetermined parity encoding codes $MC_1$-$MC_M$ by evaluating a set of criteria on the set of target parity encoding properties TEP and the sets of offered parity encoding properties $OEP_1$-$OEP_M$, wherein evaluating the set of criteria comprises comparing a target information block length k_0 and a target number of encoding parity bits p_0, comprised in the target parity encoding properties TEP, to an offered information block length k_i and an offered number of encoding parity bits p_i, comprised in the offered parity encoding properties $OEP_1$-$OEP_M$, a generating module 1230 configured to generate transmission data c_tx by encoding the input data v using the candidate parity encoding code $MC_m$, and, an optional emitting module 1240 configured to emit a wireless signal S comprising the transmission data c_tx.

In an embodiment, the first obtaining module 1210 is configured to obtain the set of predetermined parity encoding codes $MC_1$-$MC_M$ by obtaining predetermined parity encoding codes $MC_1$-$MC_M$ that have an offered information block length k_m, of the candidate parity encoding code $MC_m$, which is equal to or greater than a target information block length k_0.

In a first alternative embodiment, the second obtaining and/or selecting module 1220 is configured to obtain the candidate parity encoding code $MC_m$ if it is evaluated that an offered information block length k_m, of the candidate parity encoding code $MC_m$, is equal to or greater than the target information block length k_0.

In a second alternative embodiment, the second obtaining and/or selecting module 1220 is configured to obtain the candidate parity encoding code $MC_m$ if it is further evaluated that an offered number of encoding parity bits p_m, of the candidate parity encoding code $MC_m$, is closest to the target number of encoding parity bits p_0.

In a third alternative embodiment, the second obtaining and/or selecting module 1220 is configured to obtain the candidate parity encoding code $MC_m$ if it is evaluated that the offered number of encoding parity bits p_m, of the candidate parity encoding code $MC_m$, is equal to or greater than the target number of encoding parity bits p_0.

The first, second and third alternative embodiment described in relation to FIG. 12 may be used alone or in any combination with the remaining alternative embodiments within the scope of the present disclosure. The first and second obtaining modules are implemented as a computer program running on the processor.

Figure 14:
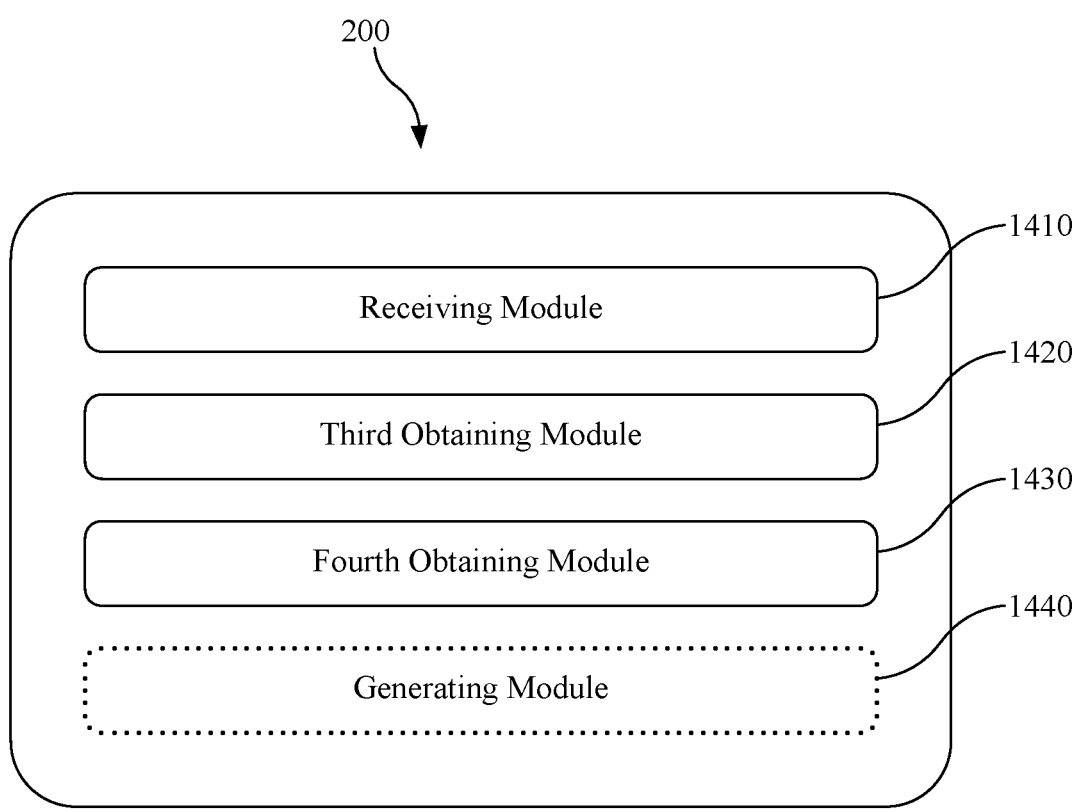
FIG. 14 shows a wireless node according to yet an embodiment of the present disclosure.

FIG. 14 shows a wireless node 100, 200 according to a further embodiment of the present disclosure. A wireless node for a wireless communication system 300 is provided, the wireless node interacting with other wireless nodes. The wireless node 100, 200 may comprise:

an optional receiving module 1410 configured to receive transmission data c_tx comprised in a wireless signal S.

A third obtaining module 1420 configured to obtain transmission data c_tx, a set of target parity encoding properties TEP for the transmission data c_tx and a set of predetermined parity encoding codes $MC_1$-$MC_M$ each having a set of offered parity encoding properties $OEP_1$-$OEP_M$.

A fourth obtaining module 1430 configured to obtain a candidate parity encoding code $MC_m$ from the set of predetermined parity encoding codes $MC_1$-$MC_M$ by evaluating a set of criteria on the set of target parity encoding properties TEP and the sets of offered parity encoding properties $OEP_1$-$OEP_M$, wherein evaluating the set of criteria comprises comparing a target information block length k_0 and a target number of encoding parity bits p_0, comprised in the target parity encoding properties TEP, to an offered information block length k_i and an offered number of encoding parity bits p_i, comprised in the offered parity encoding properties $OEP_1$-$OEP_M$.

a generating module 1440 configured to generate output data o by decoding the transmission data c_tx using the candidate parity encoding code $MC_m$.

In a fourth alternative embodiment, the fourth obtaining and/or selecting module 1430 is configured to obtain the candidate parity encoding code $MC_m$ if it is evaluated that an offered information block length k_m, of the candidate parity encoding code $MC_m$, is equal to or greater than the target information block length k_0.

In a fifth alternative embodiment, the fourth obtaining and/or selecting module 1430 is configured to obtain the candidate parity encoding code $MC_m$ if it is further evaluated that an offered number of encoding parity bits p_m, of the candidate parity encoding code $MC_m$, is closest to the target number of encoding parity bits p_0.

In a sixth alternative embodiment, the fourth obtaining and/or selecting module 1430 is configured to obtain the candidate parity encoding code $MC_m$ if it is evaluated that the offered number of encoding parity bits p_m, of the candidate parity encoding code $MC_m$, is equal to or greater than the target number of encoding parity bits p_0.

The fourth, fifth and sixth alternative embodiment described in relation to FIG. 14 may be used alone or in any combination with the remaining alternative embodiments within the scope of the present disclosure. The third and fourth obtaining modules are implemented as a computer program running on the processor.

Furthermore, any methods according to embodiments of the disclosure may be implemented in a computer program, having code means, which when run by processing means causes the processing means to execute the steps of the method. The computer program is included in a computer readable medium of a computer program product. The computer readable medium may comprise of essentially any memory, such as a ROM (Read-Only Memory), a PROM (Programmable Read-Only Memory), an EPROM (Erasable PROM), a Flash memory, an EEPROM (Electrically Erasable PROM), or a hard disk drive.

Moreover, it is realized by the skilled person that the wireless node 100, 200 may comprise the necessary communication capabilities in the form of e.g., functions, means, units, elements, etc., for performing the present solution. Examples of other such means, units, elements and functions are: processors, memory, buffers, control logic, encoders, decoders, rate matchers, de-rate matchers, mapping units, multipliers, decision units, selecting units, switches, interleavers, de-interleavers, modulators, demodulators, inputs, outputs, antennas, amplifiers, receiver units, transmitter units, DSPs, MSDs, TCM encoder, TCM decoder, power supply units, power feeders, communication interfaces, communication protocols, etc. which are suitably arranged together for performing the present solution.

Especially, the processing means of the present wireless node 100, 200 may comprise, e.g., one or more instances of a Central Processing Unit (CPU), a processing unit, a processing circuit, a processor, an Application Specific Integrated Circuit (ASIC), a microprocessor, or other processing logic that may interpret and execute instructions. The expression "processor" may thus represent a processing circuitry comprising a plurality of processing circuits, such as, e.g., any, some or all of the ones mentioned above. The processing circuitry may further perform data processing functions for inputting, outputting, and processing of data comprising data buffering and device control functions, such as call processing control, user interface control, or the like.

Finally, it should be understood that the disclosure is not limited to the embodiments described above, but also relates to and incorporates all embodiments within the scope of the appended independent claims.

The invention claimed is:

1. A method in a first wireless node for a wireless communication system, the method comprising:
obtaining input data, a set of target parity encoding properties for the input data, and a set of predetermined parity encoding codes, each having a set of offered parity encoding properties,
obtaining a candidate parity encoding code from the set of predetermined parity encoding codes by evaluating a set of criteria on the set of target parity encoding properties and the sets of offered parity encoding properties, wherein evaluating the set of criteria comprises comparing a target information block length and a target number of encoding parity bits, comprised in the target parity encoding properties, to an offered information block length and an offered number of encoding parity bits, comprised in the offered parity encoding properties, and,
generating transmission data by encoding the input data using the candidate parity encoding code.

2. The method according to claim 1, wherein the obtained candidate parity encoding code is selected based on an evaluation that an offered information block length, of the candidate parity encoding code, is equal to or greater than the target information block length.

3. The method according to claim 1, wherein the obtained candidate parity encoding code is selected based on an evaluation that an offered number of encoding parity bits, of the candidate parity encoding code, is closest to the target number of encoding parity bits.

4. The method according to claim 1, wherein the obtained candidate parity encoding code is selected based on an evaluation that the offered number of encoding parity bits, of the candidate parity encoding code, is equal to or greater than the target number of encoding parity bits.

5. The method according to claim 1, further comprising:
determining that there is a mismatch between an offered encoding rate of the candidate parity encoding code and a target encoding rate, wherein the target encoding rate is comprised in the set of target parity encoding properties and wherein the offered encoding rate is comprised in the sets of offered parity encoding properties, and
rate matching the offered encoding rate of the candidate parity encoding code by performing a selection of shortening, puncturing and repetition.

6. The method according to claim 1, wherein obtaining the set of target parity encoding properties for the input data, the set of predetermined parity encoding codes and the sets of offered parity encoding properties is performed by receiving a control signal from a second wireless node.

7. A first wireless node for a wireless communication system, the wireless node comprising:
processing means operative to perform the method according to claim 1.

8. The first wireless node according to claim 7, wherein the processing means comprises a processor and a memory stored on a non-transitory computer readable medium, and wherein said memory contains instructions executable by said processor.

9. A method for a second wireless node for a wireless communication system, the method comprising:
obtaining transmission data,
obtaining a set of target parity encoding properties for the transmission data and a set of predetermined parity encoding codes, each having a set of offered parity encoding properties,
obtaining a candidate parity encoding code from the set of predetermined parity encoding codes by evaluating a set of criteria on the set of target parity encoding properties and the sets of offered parity encoding properties, wherein evaluating the set of criteria comprises comparing a target information block length and a target number of encoding parity bits, comprised in the target parity encoding properties, to an offered information block length and an offered number of encoding parity bits, comprised in the offered parity encoding properties, and,
generate output data by decoding the transmission data using the candidate parity encoding code.

10. The method according to claim 9, wherein the obtained candidate parity encoding code is selected based on an evaluation that an offered information block length, of the candidate parity encoding code, is equal to or greater than the target information block length.

11. The method according to claim 9, wherein the obtained candidate parity encoding code is selected based on an evaluation that an offered number of encoding parity bits, of the candidate parity encoding code, is closest to the target number of encoding parity bits.

12. The method according to claim 9, wherein the obtained candidate parity encoding code is selected based on an evaluation that the offered number of encoding parity bits, of the candidate parity encoding code, is equal to or greater than the target number of encoding parity bits.

13. A second wireless node for a wireless communication system, the wireless node comprising:
processing means operative to perform the method according to claim 9.

14. The second wireless node according to claim 13, wherein the processing means comprise a processor and a memory stored on a non-transitory computer readable medium, and wherein said memory contains instructions executable by said processor.

15. A computer program, comprising instructions which, when executed on at least one processor, cause the at least one processor to carry out the method according to claim 1, wherein the computer program is stored on a non-transitory computer readable medium.

16. A computer program product comprising a memory or digital storage medium storing the computer program according to claim 15.

17. A first wireless node, the wireless node comprising:
a first obtaining module configured to obtain input data, a set of target parity encoding properties for the input data, and a set of predetermined parity encoding codes, each having a set of offered parity encoding properties,
a second obtaining module configured to obtain a candidate parity encoding code from the set of predetermined parity encoding codes by evaluating a set of criteria on the set of target parity encoding properties and the sets of offered parity encoding properties, wherein evaluating the set of criteria comprises comparing a target information block length and a target number of encoding parity bits, comprised in the target parity encoding properties, to an offered information block length and an offered number of encoding parity bits, comprised in the offered parity encoding properties, and a generating module configured to generate transmission data by encoding the input data using the candidate parity encoding code.

18. The wireless node according to claim 17, wherein the second obtaining module is configured to obtain the candidate parity encoding code based on an evaluation that an offered information block length, of the candidate parity encoding code, is equal to or greater than the target information block length.

19. The wireless node according to claim 17, wherein the second obtaining module is configured to obtain the candidate parity encoding code based on an evaluation that an offered number of encoding parity bits, of the candidate parity encoding code, is closest to the target number of encoding parity bits.

20. The wireless node according to claim 17, wherein the second obtaining module is configured to obtain the candidate parity encoding code based on an evaluation that the offered number of encoding parity bits, of the candidate parity encoding code, is equal to or greater than the target number of encoding parity bits.

* * * * *